United States Patent
Park et al.

(10) Patent No.: US 9,436,311 B2
(45) Date of Patent: *Sep. 6, 2016

(54) MOBILE TERMINAL AND CONTROL METHOD THEREOF

(71) Applicant: LG ELECTRONICS INC., Seoul (KR)

(72) Inventors: Jiyoung Park, Anseong (KR); Sujin Kim, Busan (KR); Jumin Chi, Busan (KR); Jaeho Choi, Seoul (KR); Sunghye Yoon, Busan (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,885

(22) Filed: Mar. 2, 2015

(65) Prior Publication Data

US 2015/0169127 A1    Jun. 18, 2015

Related U.S. Application Data

(63) Continuation of application No. 13/615,970, filed on Sep. 14, 2012, now Pat. No. 8,994,651.

(30) Foreign Application Priority Data

May 3, 2012    (EP) ..................................... 12003248
May 14, 2012    (KR) ........................ 10-2012-0051151

(51) Int. Cl.
| | |
|---|---|
| *G06F 3/041* | (2006.01) |
| *G09G 3/00* | (2006.01) |
| *H04M 1/02* | (2006.01) |
| *H04M 1/67* | (2006.01) |
| *H04M 1/725* | (2006.01) |
| *G06F 1/16* | (2006.01) |

(52) U.S. Cl.
CPC ........... *G06F 3/0414* (2013.01); *G06F 1/1652* (2013.01); *G09G 3/001* (2013.01); *H04M 1/0202* (2013.01); *H04M 1/0268* (2013.01); *H04M 1/67* (2013.01); *H04M 1/72519* (2013.01); *G09G 2340/0492* (2013.01)

(58) Field of Classification Search
USPC ................. 345/173, 174, 156, 30, 204, 211; 455/566; 313/46
See application file for complete search history.

(56) References Cited

U.S. PATENT DOCUMENTS

| | | | |
|---|---|---|---|
| 7,019,728 | B2 | 3/2006 | Lee et al. |
| 7,522,153 | B2 | 4/2009 | Ohtsuka |
| 2005/0140646 | A1 | 6/2005 | Nozawa |
| 2006/0055663 | A1 | 3/2006 | Ohtsuka |
| 2006/0114215 | A1 | 6/2006 | Lee et al. |

(Continued)

FOREIGN PATENT DOCUMENTS

| | | |
|---|---|---|
| EP | 2 312 429 A1 | 4/2011 |
| EP | 2418558 A2 | 2/2012 |
| WO | WO 2007/041284 A2 | 4/2007 |

*Primary Examiner* — Thuy Pardo
(74) *Attorney, Agent, or Firm* — Birch, Stewart, Kolasch & Birch, LLP

(57) ABSTRACT

A mobile terminal including a flexible display unit configured to be bent in response to an applied physical force; a detection unit configured to detect a bending of the flexible display unit; and a control unit configured to execute at least one of a first function or a second function in response to the bending of the flexible display unit. Further, the second function is executed when the bending of the flexible display unit is maintained for a reference time, the second function being executed after the first function is executed.

20 Claims, 22 Drawing Sheets

(56) References Cited

U.S. PATENT DOCUMENTS

| | | |
|---|---|---|
| 2006/0238494 A1 | 10/2006 | Narayanaswami et al. |
| 2006/0279507 A1 | 12/2006 | Nakao et al. |
| 2009/0312051 A1 | 12/2009 | Hansson et al. |
| 2010/0011291 A1 | 1/2010 | Nurmi |
| 2011/0133621 A1* | 6/2011 | Zhokhavets ............... H01J 1/88 313/46 |
| 2011/0167391 A1 | 7/2011 | Momeyer et al. |
| 2012/0038613 A1* | 2/2012 | Choi .................... G06F 1/1652 345/211 |
| 2012/0188153 A1* | 7/2012 | Tziortzis ............... G06F 1/1641 345/156 |
| 2013/0135182 A1* | 5/2013 | Jung ........................ G09G 3/00 345/30 |
| 2013/0169520 A1* | 7/2013 | Cho ...................... G06F 3/0488 345/156 |
| 2013/0169562 A1* | 7/2013 | Cho ...................... G06F 3/0488 345/173 |
| 2013/0203469 A1* | 8/2013 | Cho .................... G06F 3/04886 455/566 |
| 2013/0215041 A1* | 8/2013 | Kim ...................... G06F 3/0487 345/173 |
| 2014/0002402 A1* | 1/2014 | Kang .................... G06F 1/1626 345/173 |
| 2014/0132506 A1* | 5/2014 | Cho ...................... G06F 3/0488 345/156 |

* cited by examiner

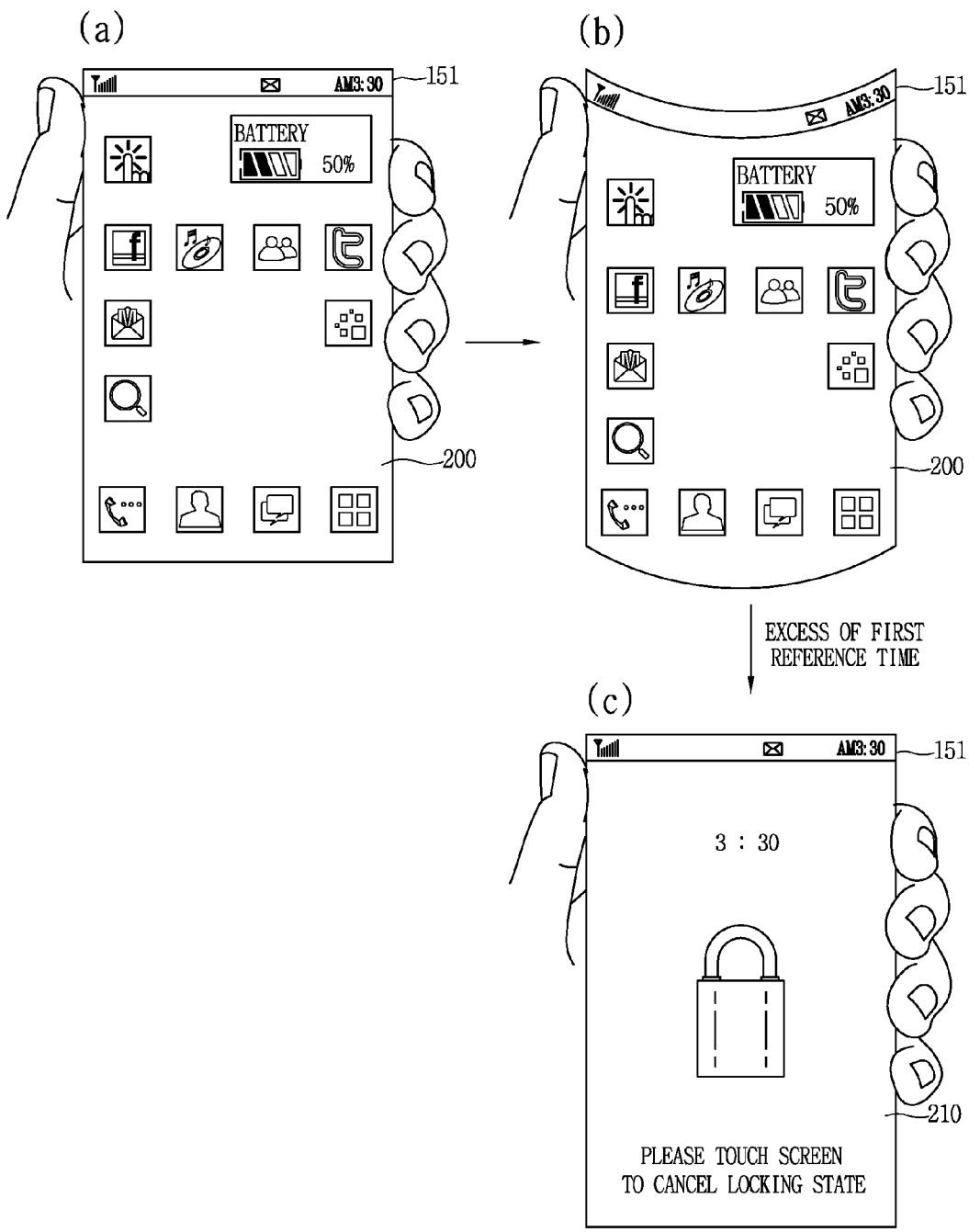

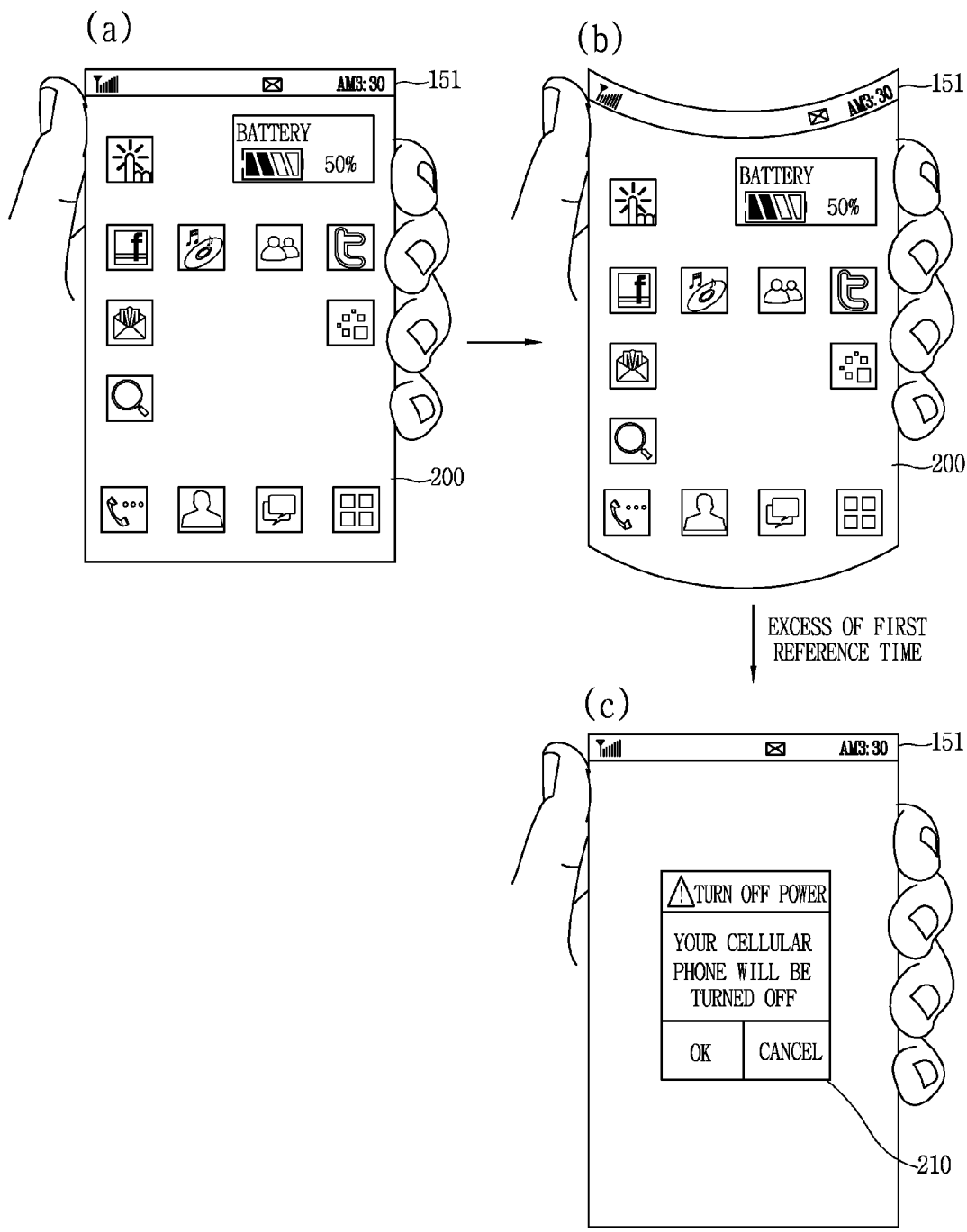

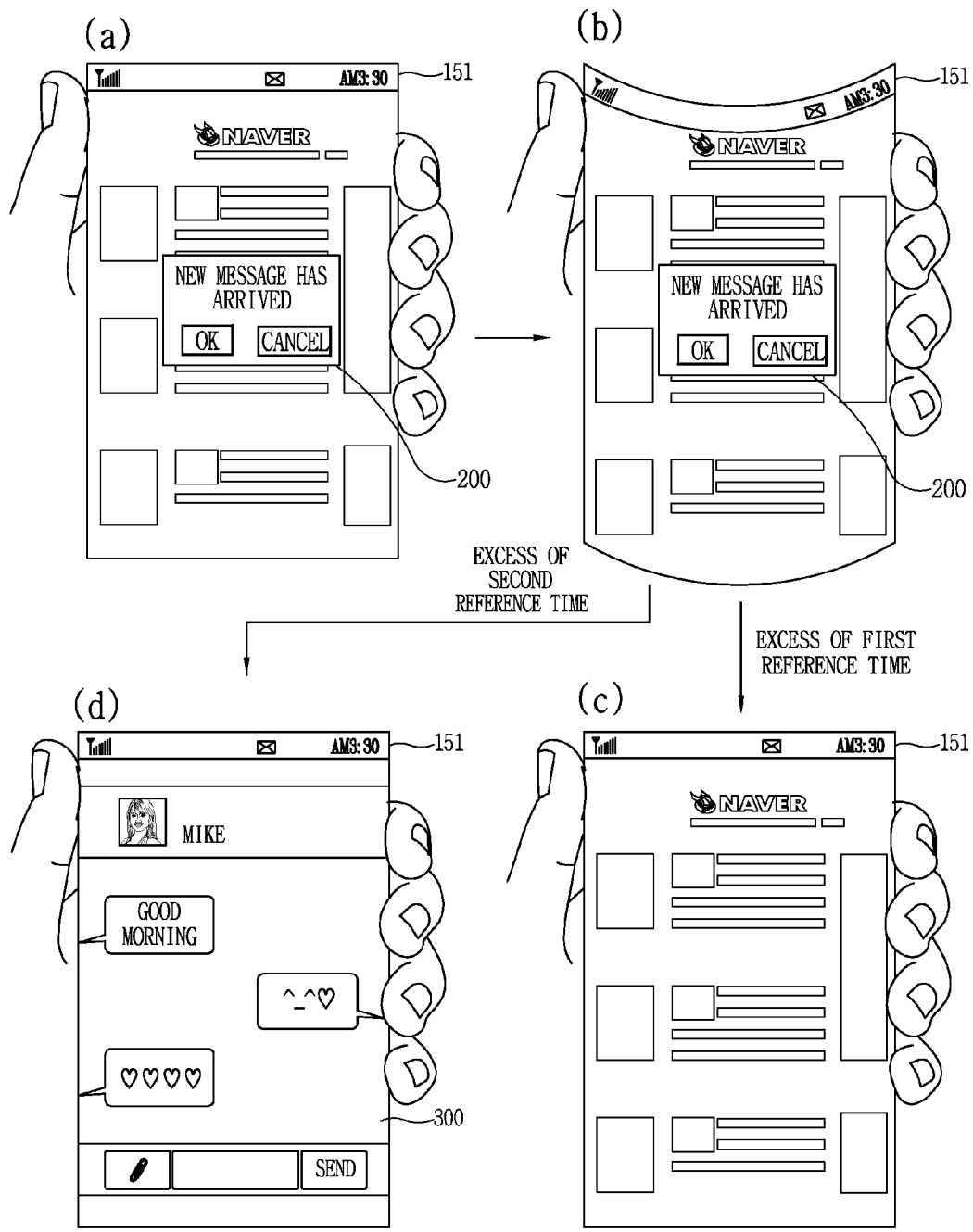

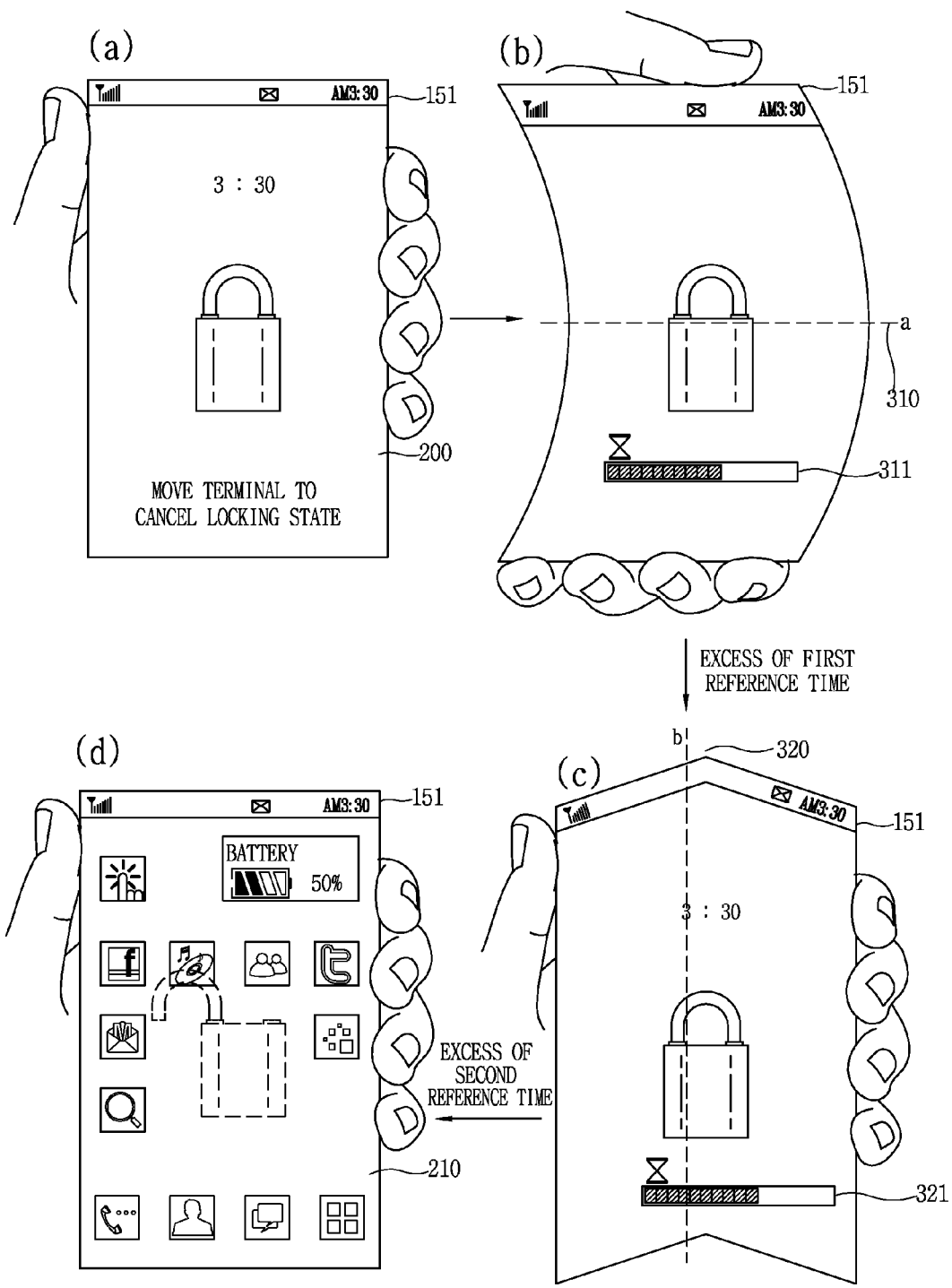

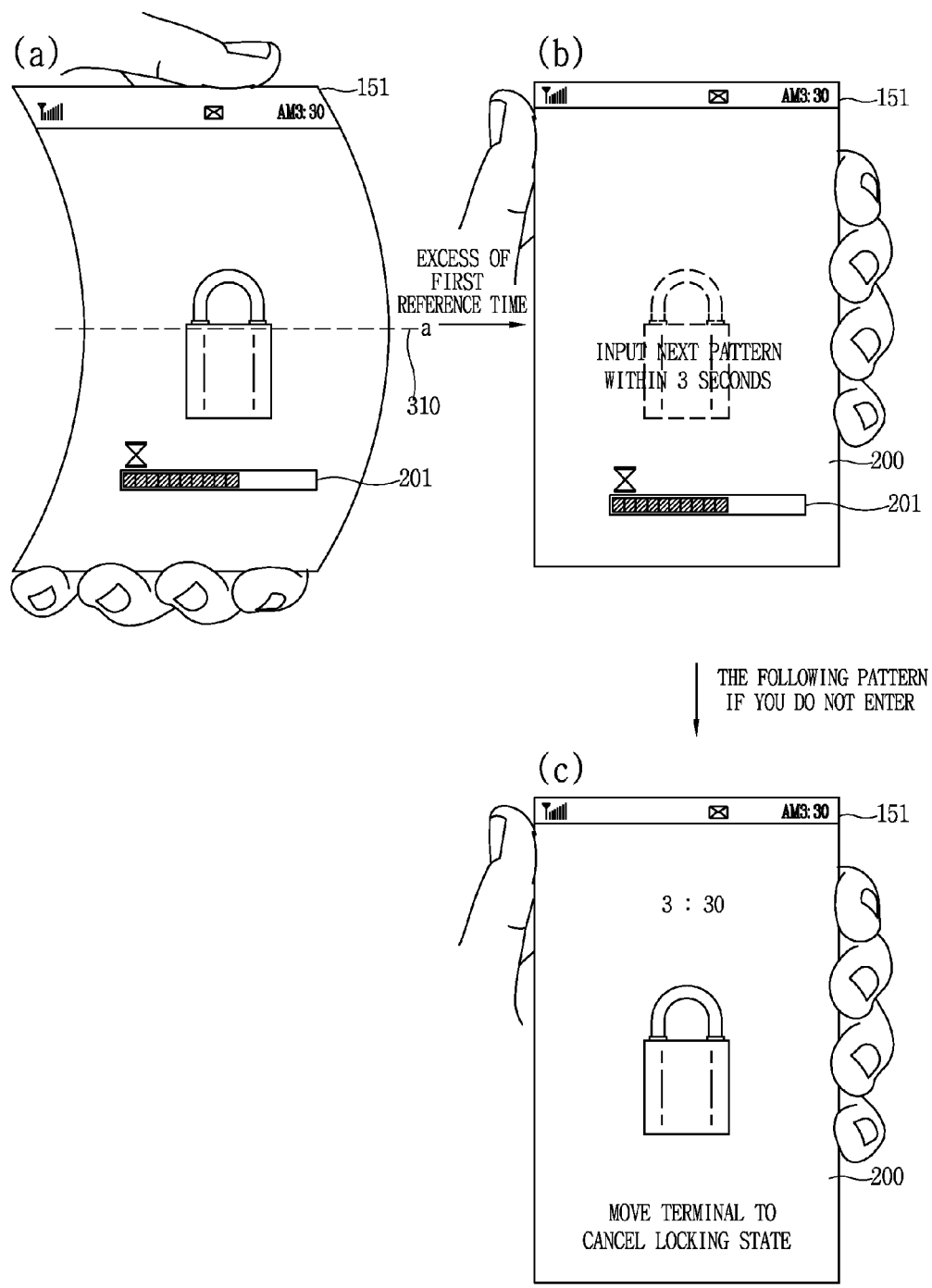

MOBILE TERMINAL AND CONTROL METHOD THEREOF

CROSS-REFERENCE TO RELATED APPLICATION

This application is a Continuation of co-pending U.S. application Ser. No. 13/615,970 filed Sep. 14, 2012, which claims the benefit of earlier filing date and right of priority to Korean Application No. 10-2012-0051151 filed on May 14, 2012 and European Application No. 12003248.7, filed on May 3, 2012. The contents of all of these applications are hereby expressly incorporated by reference as fully set forth herein, in their entirety.

BACKGROUND OF THE INVENTION

1. Field of the Invention

The present disclosure relates to a mobile terminal including a flexible display unit and a control method thereof.

2. Background of the Invention

Terminals may be divided into mobile/portable terminals and stationary terminals according to whether or not the terminals are movable. In addition, the mobile/portable terminals may be divided into handheld terminals and vehicle mount terminals according to whether or not the terminals can be directly carried by users.

As the functionality of such terminals is diversified, the terminals have been implemented in the form of a multimedia player having complex functions including, for example, photographing or video capturing functions, music or video file playback functions, game play functions, broadcast reception functions, etc. To support and increase the functionality of such terminals, consideration to improve hardware parts and/or software parts of the terminal may be made.

In general, terminals have been developed in various types of designs, and accordingly, flexible displays have come into the spotlight because of their light and unbreakable characteristics.

SUMMARY OF THE INVENTION

Therefore, an aspect of the detailed description is to provide a mobile terminal capable of generating a control command using the characteristic of a flexible display, in which bending is possible, and a control method of the mobile terminal.

To achieve these and other advantages and in accordance with the purpose of this specification, as embodied and broadly described herein, a mobile terminal includes a flexible display unit configured to be bent corresponding to a physical force applied from an outside thereof, a detection unit configured to detect bending of the flexible display unit and a time for which the bending is maintained, and a control unit configured to generate different control signals related to functions of the mobile terminal including the flexible display unit, according to the time for which the bending is maintained.

In one embodiment, when the bending of the flexible display unit is restored, the control unit may perform a function corresponding to the generated control signal based on the time for which the bending is maintained.

In one embodiment, the control unit may generate a first control signal related to a first function when the bending is maintained for a first reference time, and generate a second control signal related to a second function different from the first function when the bending is maintained for a second reference time different from the first reference time.

In one embodiment, the control unit may perform a locking mode for restricting an input of a control command for an application, in response to that the bending of the flexible display unit is maintained for the first reference time, and finish a system of the mobile terminal so that the supply of power to the mobile terminal is stopped, in response to that the bending of the flexible display unit is maintained for the second reference time.

In one embodiment, the control unit may control the detection unit to detect the bending of the flexible display unit and the time for which the bending is maintained, in response to that an event occurs in the mobile terminal.

In one embodiment, the control unit may perform different functions related to the event, according to the time for which the bending is maintained.

In one embodiment, the event may be a call reception event, and the control unit may perform a call reception function, in response to the call reception event, so that a call corresponding to the call reception event is received when the bending of the flexible display unit is maintained for the first reference time, and perform a message function, in response to the call reception event, so that a message corresponding to the call reception event is transmitted to an external terminal when the bending of the flexible display unit is maintained for the second reference time.

In one embodiment, a plurality of items respectively corresponding to a plurality of functions to be performed in related to the event may be displayed on the flexible display unit, and the control unit may perform a function corresponding to any one of the plurality of items according to the time for which the bending of the flexible display unit is maintained.

In one embodiment, the function performed according to the time for which the bending of the flexible display unit is maintained may be based on an order in which the plurality of items are disposed.

In one embodiment, the control unit may determine a function to be performed corresponding to the time for which the bending of the flexible display unit is maintained, and highlight an item corresponding to the determined function among the plurality of items so that the item is distinguished from the other items.

In one embodiment, the highlighted item among the plurality of items may be changed depending on the time for which the bending of the flexible display unit is maintained.

In one embodiment, a popup window for informing that the event has occurred may be output on the flexible display unit, and a plurality of items respectively corresponding to a plurality of functions related to the event may be displayed on the popup window.

In one embodiment, the control unit may perform any one of the plurality of functions based on the time for which the bending is maintained when the bending of the flexible display unit is made corresponding to a reference direction, and finish displaying the popup window when the bending of the flexible display unit is made corresponding to a direction opposite to the reference direction.

In one embodiment, the information displayed on the flexible display unit based on the control signal may be changed based on at least one of a bending position of the flexible display unit, a speed at which the bending position is changed, and a bending direction of the flexible display unit.

In one embodiment, when the speed at which the bending position of the flexible display unit is a reference speed, the control unit scrolls the information displayed on the flexible display unit.

In one embodiment, the control unit may magnify or reduce the information displayed on the flexible display unit, based on the bending direction of the flexible display unit.

To achieve the above aspect of this specification, a control method of a mobile terminal including a flexible display unit to be bended corresponding to a physical force applied from an outside thereof, the control method includes detecting bending of the flexible display unit and a time for which the bending is maintained, generating different control signals related to functions of the mobile terminal including the flexible display unit, based on the time when the bending is maintained, and performing a function corresponding to the generated control signal, in response to that the bending of the flexible display unit is restored.

In one embodiment, the generating of the control signal may include generating a first control signal related to a first function when the bending is maintained for a first reference time, and generating a second control signal related to a second function different from the first function when the bending is maintained for a second reference time different from the first reference time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIGS. 4A, 4B, 4C, 4D, 4E, 4F and 4G are conceptual diagrams illustrating the control method of FIG. 3;

FIGS. 5A, 5B, 6A, 6B and 6C are conceptual diagrams illustrating a method of generating a control signal through the flexible display unit corresponding to an event in the mobile terminal according to an embodiment of the present invention;

FIGS. 9A, 9B and 9C are conceptual diagrams illustrating a method of converting a locking state into a cancellation state using a bending property and time of the flexible display unit in the mobile terminal according to an embodiment of the present invention.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated. In the following description, suffixes "module" and "unit or portion" for components used herein in description are merely provided only for facilitation of preparing this specification, and thus they are not granted a specific meaning or function. In the following description, detailed explanation of known related functions and constitutions may be omitted to avoid unnecessarily obscuring the subject manner of the invention. The accompanying drawings are merely provided for illustrative purposes and should not be interpreted to limit the scope of the claims.

Mobile terminals described in this specification may include a cellular phone, smart phone, a laptop computer, a terminal for digital broadcast, a personal digital assistant (PDA), a portable multimedia player (PMP), a navigator, a slate PC, a tablet PC, an ultra book, etc. However, it can be readily understood by those skilled in the art that configurations according to embodiments described in this specification may be applied to stationary terminals such as a digital TV and a desktop computer, except a case in which the configurations are applicable to only the mobile terminals.

Figure 1:
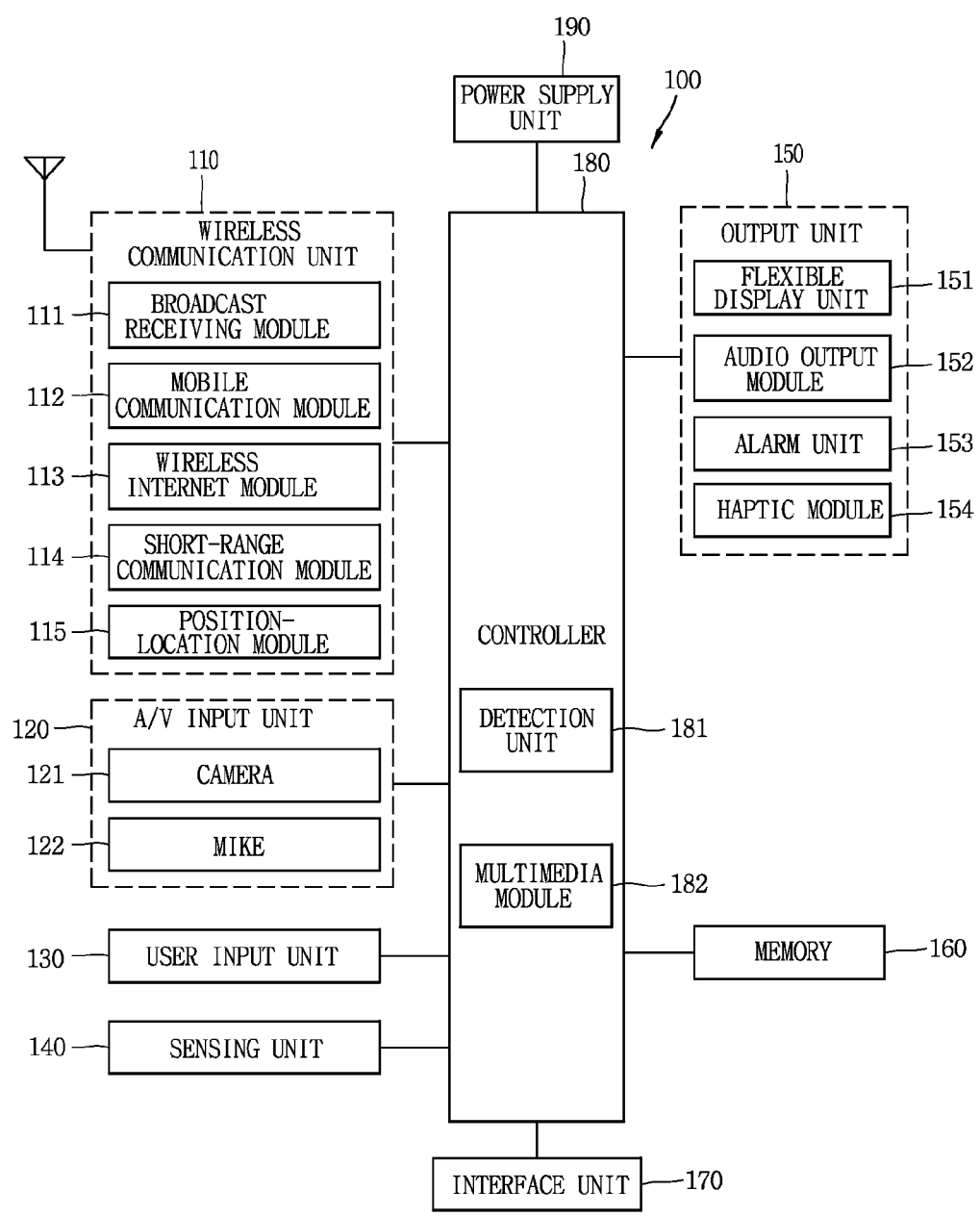
FIG. 1 is a block diagram illustrating a mobile terminal according to an embodiment of the present invention.

FIG. 1 is a block diagram illustrating a mobile terminal according to an embodiment of the present invention. As shown, the mobile terminal 100 may include a wireless communication unit 110, an audio/video (A/V) input unit 120, a user input unit 130, a sensing unit 140, an output unit 150, a memory 160, an interface unit 170, a control unit 180, a power supply unit 190, etc. The components shown in FIG. 1 are not essential, and therefore, the terminal 100 may be implemented to have a larger number of components or to have a smaller number of components.

The wireless communication unit 110 may include one or more modules enabling wireless communications between the mobile terminal 100 and a wireless communication system or between networks in which the respective mobile terminals 100 are located. For example, the wireless communication unit 110 may include a broadcast receiving module 111, a mobile communication module 112, a wireless Internet module 113, a short range communication module 114, a positioning module 115, etc.

The broadcast receiving module 111 receives a broadcast signal and/or broadcast relate information from an external broadcast management server through a broadcast channel. Further, the broadcast channel may include satellite and terrestrial channels. The broadcast management server may mean a server that generates a broadcast signal and/or broadcast related information and transmits the generated broadcast signal and/or broadcast related information or a server that receives a previously generated broadcast signal and/or broadcast related information and transmits the received broadcast signal and/or broadcast related information to the mobile terminal. The broadcast signal may include not only a TV broadcast signal, a radio broadcast signal and a data broadcast signal but also a broadcast signal obtained by combining the data broadcast signal with the TV broadcast signal or radio broadcast signal.

The broadcast related information may mean information related to a broadcast channel, broadcast program or broadcast provider. The broadcast related information may also be provided through a mobile communication network. In this case, the broadcast related information may be received by the mobile communication module 112.

The broadcast related information may exist in various forms. For example, the broadcast related information may exist in the form of an electronic program guide (EPG) of digital multimedia broadcasting (DMB), an electronic service guide (ESG) of digital video broadcast-handheld (DVB-H), etc.

The broadcast receiving module 111 may receive a digital broadcast signal using, for example, a digital broadcasting system including digital multimedia broadcasting-terrestrial (DMB-T), digital multimedia broadcasting-satellite (DMB-S), media forward link only (MediaFLO), digital video broadcasting-handheld (DMB-H), integrated service digital broadcast-terrestrial (ISDB-T), etc. It will be apparent that the broadcast receiving module 111 may be configured to be suitable for not only the aforementioned digital broadcasting system but also other broadcasting systems. The broadcast signal and/or the broadcast related information may be stored in the memory 160 through the broadcast receiving module 111.

The mobile communication module 112 communicates a wireless signal with at least one of a base station, an external terminal and a server on a mobile communication network. The wireless signal may include various types of data according to the communication of a voice call signal, a video communication call signal or character/multimedia message.

The mobile communication module 112 is configured to implement a video communication mode and a voice communication mode. The video communication mode refers to a state in which a user communicates with a companion while watching a companion's image, and the voice communication mode refers to a state in which the user communicates with the companion while not watching the companion's image. To implement the video communication mode and the voice communication mode, the mobile communication module 112 is formed to transmit/receive at least one of a voice and an image.

The wireless Internet module 113 refers to a module for wireless Internet connection, and may be mounted inside or outside the mobile terminal 100. The wireless Internet technology may include wireless LAN (WLAN), wireless broadband (Wibro), world interoperability for microwave access (Wimax), high speed downlink packet access (HSDPA), etc.

The short range communication module 114 refers to a module for short range communication. The short range communication technology may include Bluetooth, radio frequency identification (RFID), infrared data association (IrDA), ultra wideband (UWB), Zigbee, etc. Further, the positioning module 115 refers to a module for obtaining the position of a mobile terminal, and a global positioning system (GPS) module is used as a representative example of the positioning module 115.

Referring to FIG. 1, the A/V input unit 120 is used to input an audio or video signal, and may include a camera 121, a microphone 122, etc. The camera 121 processes an image frame such as a still image or moving image obtained by an image sensor in a video communication mode or photographing mode. The processed image frame may be displayed on the display unit 151.

The image frame processed in the camera 121 may be stored in the memory 16 or may be transmitted to the outside of the mobile terminal 100 through the wireless communication unit 110. The camera 121 may be provided with two or more cameras according to the environment used.

The microphone 122 receives an external sound signal by a microphone in a communication mode, recording mode, voice recognition mode, etc. and processes the received sound signal as electrical voice data. In case of the communication mode, the processed voice data may be converted into a form capable of being transmitted to a mobile communication base station through the mobile communication module 112 and then transmitted. Various noise removal algorithms for removing noises generated in the process of receiving the input external sound signal may be implemented in the microphone 122.

The user input unit 130 generates input data through which the user controls operations of the mobile terminal. The user input unit 130 may be configured to include a key pad, a dome switch, a touch pad (static voltage/static current), a jog wheel, a jog switch, etc.

The sensing unit 140 senses a current state of the mobile terminal 100, such as an opening/closing state, a position of the mobile terminal 100, a presence of user's contact with the mobile terminal 100 or an increase/decrease in the speed of the mobile terminal 100, and generates a sensing signal for controlling an operation of the mobile terminal 100. For example, when the mobile terminal 100 has the form of a slide phone, the sensing unit 140 may sense the presence of opening/closing of the slide phone. The sensing unit 140 may sense whether or not the power supply unit 190 supplies power, whether or not the interface unit 170 is connected to an external device, etc.

The output unit 150 is used to generate an output related to a visual sense, auditory sense, haptic sense, etc. The output unit 150 may include a display unit 151, a sound output module, an alarm unit 153, a haptic module 154, etc. Further, the display unit 151 displays (outputs) information processed in the mobile terminal 100. For example, when the mobile terminal 100 is in a communication mode, the display unit 151 displays a user interface (UI) or graphic user interface (GUI) related to communication. When the mobile terminal 100 is in a video communication mode or photographing mode, the display unit 151 displays a photographed and/or received image, UI or GUI.

The display unit 151 may include at least one of a liquid crystal display (LCD), a thin film transistor-liquid crystal display (TFT LCD), an organic light-emitting diode (OLED), a flexible display, a 3D display and an electronic-ink (e-ink) display.

Some of the displays may be configured as transparent or light-transmissive displays through which a user can see an outside view. These displays may be called as transparent displays, and a transparent OLED (TOLED), etc. may be used as a representative of the transparent displays. The rear structure of the display unit 151 may also be configured as a light-transmissive structure. Through such a structure, the user can see an object positioned at the rear of a body of the mobile terminal 100 through an area occupied by the display unit 151 of the body of the mobile terminal 100.

Two or more display units 151 may exist according to the implementation of the mobile terminal 100. For example, in the mobile terminal according to the embodiments, a plurality of display units may be spaced apart from one another or integrally arranged on one surface, or may be arranged on different surfaces from one another. When the display unit 151 and a sensor sensing a touch operation (hereinafter, referred to as a 'touch sensor') forms an inter-layer structure (hereinafter, referred to as a 'touch screen'), the display unit 151 may be used as an input device as well as an output device. The touch sensor may have the form of, for example, a touch film, touch sheet, touch pad, etc.

The touch sensor may be configured to convert, into an electrical input signal, a change in pressure applied to a specific portion of the display unit 151, capacitance generated at the specific portion of the display unit 151, etc. The touch sensor may have, for example, the form of a touch film, touch sheet, touch pad, etc.

When the touch sensor senses a touch input, a signal(s) corresponding to the touch input is transmitted to a touch controller. The touch controller processes the signal(s) and transmits data corresponding to the processed signal(s) to the control unit 180. Accordingly, the control unit 180 can detect which portion of the display unit 151 has been touched, etc.

Referring to FIG. 1, a proximity sensor may be disposed in an internal region of the mobile terminal or in the vicinity of the touch screen. The proximity sensor refers to a sensor that detects, without any mechanical contact, the presence of an object approaching a predetermined detection surface or an object existing near the predetermined surface using an electromagnetic force or infrared. The proximity sensor has a longer lifetime and higher utilization than a contact sensor.

The proximity sensor may include, for example, a transmissive photoelectric sensor, a mirror reflective photoelectric sensor, a high-frequency oscillation proximity sensor, a capacitive proximity sensor, a magnetic proximity sensor, an infrared proximity sensor, etc. When the touch screen is a capacitive touch screen, the touch screen is configured to detect the proximity of a pointer through a change in electric field according the proximity of the pointer. In this case, the touch screen (touch sensor) may be classified as the proximity sensor.

Hereinafter, for convenience of illustration, the action that the pointer comes close to the touch screen while not being contacted on the touch screen so as to be recognized that the pointer is placed on the touch screen is referred to as a "proximity touch," and the action that the pointer is substantially contacted on the touch screen is referred to as a "contact touch." The position at which the pointer is proximately touched on the touch screen means a position at which when the pointer is proximately touched, the pointer corresponds vertically to the touch screen.

The proximity sensor senses a proximity touch action and a proximity touch pattern (e.g., a proximity touch distance, proximity touch direction, proximity touch speed, a proximity touch time, proximity touch position, proximity touch movement state, etc.). Information corresponding to the sensed proximity touch action and proximity touch pattern may be output on the touch screen.

The sound output module 152 may receive a call signal from the wireless communication unit 110 in a communication or recoding mode, voice recognition mode, broadcast receiving mode, etc., and may output the audio data stored in the memory 160. The sound output module 152 may output a sound signal related to a function (e.g., a call signal receiving sound, message receiving sound, etc.) performed by the mobile terminal 100. The sound output module 152 may include a receiver, a speaker, a buzzer, etc.

The alarm unit 153 outputs a signal for informing that an event occurs in the mobile terminal 100. The event occurring in the mobile terminal 100 includes, for example, call signal reception, message reception, key signal input, touch input, etc. The alarm unit 153 may output, for example, a signal for informing the occurrence of an event through vibration, as well as a video or audio signal. Since the video or audio signal may be output through the display unit 151 or the sound output module 152, the display unit 151 and the sound output module 152 may be classified as a portion of the alarm unit 153.

The haptic module 154 generates various haptic effects that a user can feel. A vibration is used as a representative of the haptic effects generated by the haptic module 154. The intensity and pattern of the vibration generated by the haptic module 154 may be controlled. For example, different vibrations may be synthesized and output or may be sequentially output.

In addition to the vibration, the haptic module 154 may generate various haptic effects including an effect caused by the arrangement of pins performing a vertical movement on a contact skin surface, an effect caused by the jet force or absorption force of air through an absorption port, an effect caused by the graze through a skin surface, an effect caused by the contact of an electrode, an effect caused by a stimulus such as an electrostatic force, an effect caused by the reproduction of a cool and warm feeling using an element for heat absorption or generation, etc.

The haptic module 154 may be implemented not only to provide a user with a haptic effect through a direct contact but also to allow the user to feel a haptic effect through a muscle sense using a finger, arm, etc. The haptic module 154 may be provided with two or more haptic modules according to the environment used.

The memory 160 may store a program for operations of the control unit 180, and may temporarily store input/output data (e.g., a phone book, a message, a still image, a moving image, etc.). The memory 160 may store data for vibration and sound of various patterns, which are output when a touch is input on the touch screen.

The memory 160 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM) and a programmable read-only memory (PROM). The mobile terminal 100 may operate a web storage performing a storage function of the memory unit 160 on the Internet or may operate in relation to the web storage.

The interface unit 170 serves as a gateway to all external devices connected to the mobile terminal 100. The interface unit 170 may receive data from an external device, may receive power and provide the received power to each of the components in the mobile terminal 100, or may allow data in the mobile terminal 100 to be transmitted to the external device. For example, the interface unit 170 may include a wired/wireless headset port, an external charger port, a wired/wireless data port, a memory card port, a port for connecting an apparatus provided with an identification module, an audio input/output (I/O) port, a video I/O port, an earphone port, etc.

The identification module is a chip in which various information for authenticating the use right of the mobile terminal 100, and may include a user identify module (UIM), a subscriber identity module (SIM), a universal subscriber identity module USIM, etc. The apparatus provided with the identification module (hereinafter, referred to as an 'identification apparatus') may be manufactured in the form of a smart card. Therefore, the identification apparatus may be connected to the mobile terminal 100 through a port.

When the mobile terminal 100 is connected to an external cradle, the interface unit 170 may become a path along which power is supplied from the cradle to the mobile terminal 100, or may become a path along which various command signals input from the cradle are provided to the mobile terminal 100. The power or various command signals input from the cradle may be operated as a signal for recognizing that the mobile terminal 100 has been exactly mounted to the cradle.

The control unit 180 generally controls overall operations of the mobile terminal 100. For example, the control unit 180 performs relative control and processing for voice conversation, data communication, video conversation, etc. The control unit 180 may have a multimedia module 182 for multimedia reproduction. The multimedia module 182 may be implemented in the control unit 180 or may be implemented separately from the control unit 180.

The control unit 180 may perform pattern recognition processing so that a writing or drawing input performed on the touch screen can be recognized as a character or image. If the state of the mobile terminal 100 satisfies a set condition, the control unit 180 may perform a locking state limiting the user's input of a command input for applications. The control unit 180 may control a locking screen displayed in the locking state based on a touch input sensed through the display unit (hereinafter, referred to as a 'touch screen') 151 in the locking state.

The power supply unit 190 receives external power and/or internal power under a control of the control unit 180 so as to supply power necessary for the operation of each of the components.

The various embodiments described herein may be implemented in a recording medium readable by a computer or device similar to the computer, for example, using software, hardware or combination of the software and hardware.

According to the implementation using the hardware, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and electrical units for performing other functions. In some cases, the embodiments described in this specification may be implemented as the control unit 180 itself.

According to the implementation using the software, embodiments such as procedures and functions described in this specification may be implemented as separate software modules. Each of the software modules may perform one or more functions and operations described in this specification.

Software codes may be implemented using a software application written by an appropriate programming language. The software codes may be stored in the memory 160, and may be performed by the control unit 180.

Figure 2A:
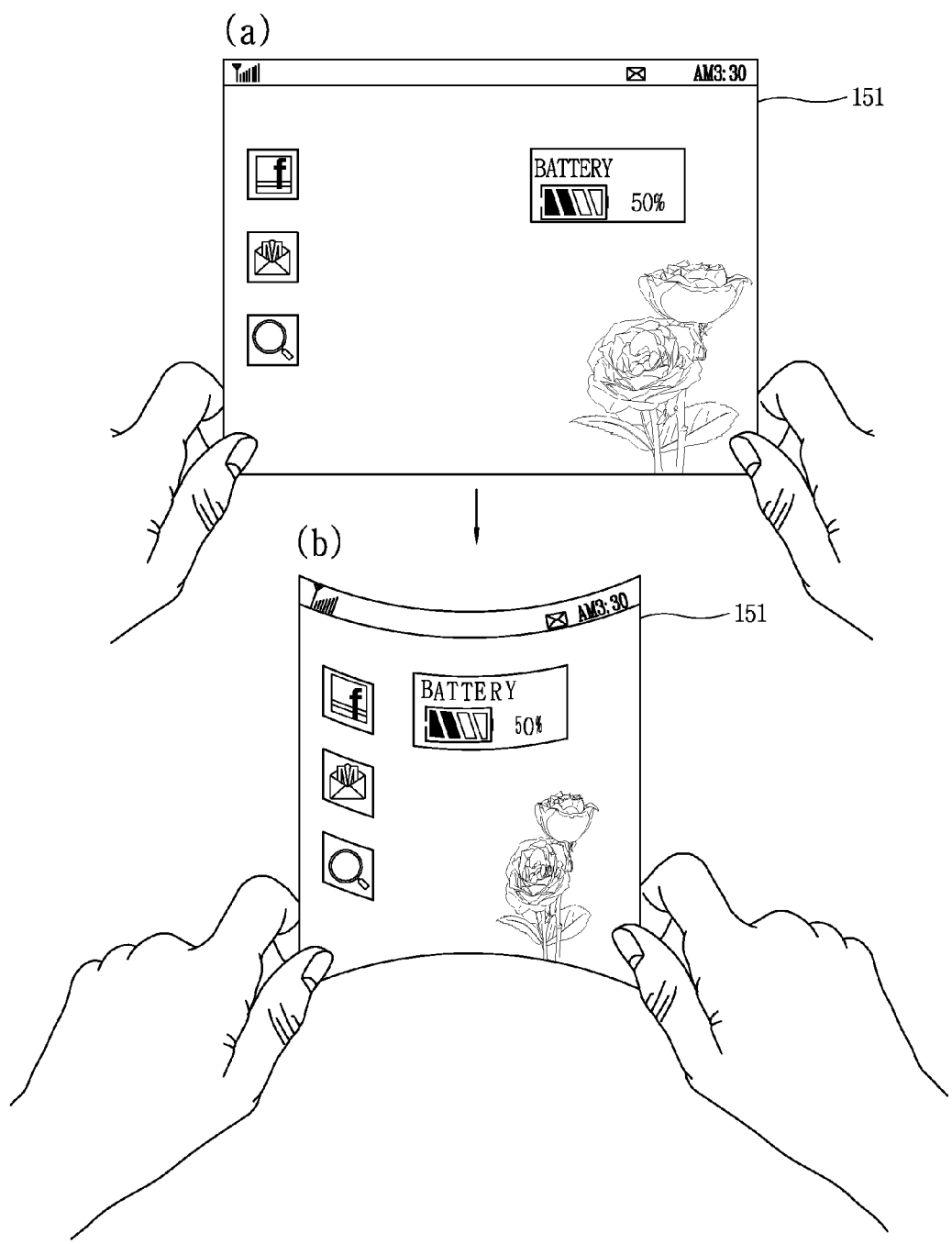
FIGS. 2A and 2B are conceptual diagrams illustrating a flexible display unit included in the mobile terminal according to an embodiment of the present invention.
Figure 2B:
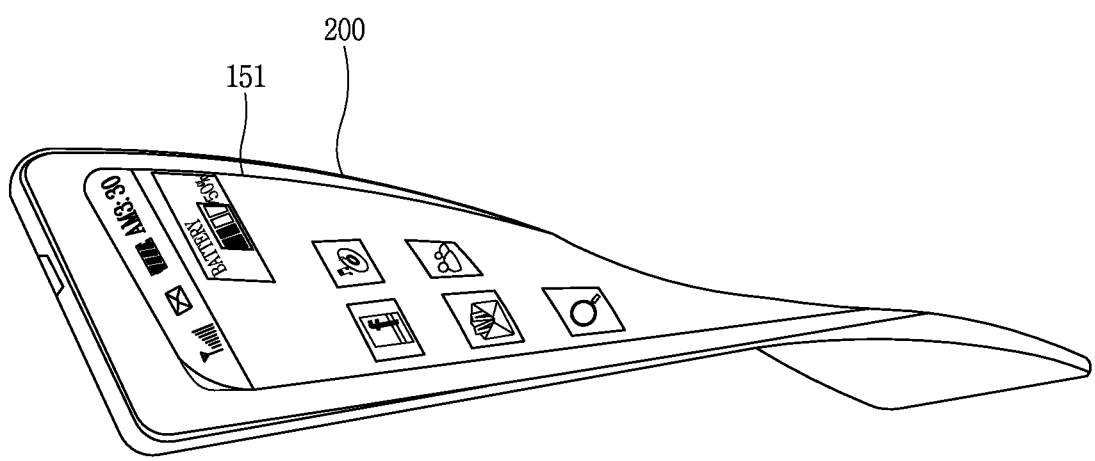

Meanwhile, information processed in the mobile terminal 100 may be displayed using a flexible display. Hereinafter, the flexible display unit will be described in detail with reference to the accompanying drawings. FIGS. 2A and 2B are conceptual diagrams illustrating the flexible display unit included in the mobile terminal according to an embodiment of the present invention.

As shown in FIGS. 2A (*a*) and (*b*), the flexible display unit 151 includes a display capable of being bent, folded or rolled by a physical force applied to the outside thereof. Here, the flexible display unit 151 may include both a general flexible display and an electronic paper.

The general flexible display refers to a solid display that is light and unbreakable by being manufactured on a thin and flexible substrate capable of being bent, folded or rolled, such as paper, while maintaining display characteristics of existing flat-panel displays.

The electronic paper refers to a display technique to which features of a general ink are applied. The electronic paper may be different from the general flat-panel display in which the electronic paper uses reflected light. In the electronic paper, figures or characters may be changed by utilizing twist balls or utilizing electrophoresis using capsules.

Meanwhile, a detection unit 181 (see FIG. 1) is provided on the flexible display unit 151, so as to detect bending information of the flexible display unit 151. In this specification, the term 'bending' may include all meanings of 'bending,' 'rolling,' 'folding' and 'curving.'

The detection unit 181 may be entirely or partially disposed on the flexible display unit 151, and may detect bending information of the flexible display unit 151. Here, the bending information may include a bent direction of the flexible display unit, a bent degree of the flexible display unit, a bent direction of the flexible display unit, a bent time of the flexible display unit, an acceleration at which the bent flexible display unit is restored to the original state, etc. In addition, the bending information may be various information detectable due to the bending of the flexible display 151.

The control unit 180 may change information on displayed on the flexible display unit 151 or generate a control signal for controlling a function of the mobile terminal, based on the bending information of the flexible display unit 151, detected by the detection unit 181.

When the flexible display unit 151 is bent corresponding to an external physical force, the control unit 180 may rearrange as shown in FIGS. 2 (*a*) and (*b*), separate or combine screen images previously displayed on the flexible display unit 151, or may change a song, according to the bent direction of the flexible display unit, the bent angle of the flexible display unit and the acceleration at which the flexible display unit is restored to the original state.

For example, if the flexible display unit 151 is bent inward by the external physical force as shown in FIGS. 2 (*a*) and (*b*), the control unit 180 may control the screen images displayed on the flexible display unit 151 to be displayed while coming close to one another. On the contrary, if the flexible display unit 151 is bent outward by the external physical force, the control unit 180 may control the screen images displayed on the flexible display unit 151 to be displayed while being spaced apart from one another.

In addition to the methods described above, the control unit 180 may variously control the method of displaying information on the flexible display unit 151 so that a user can exactly recognize the information displayed on the flexible display unit 151, corresponding to the bending of the flexible display unit 151.

Meanwhile, the mobile terminal 100 including the flexible display unit 151 may include a case 200 surrounding the flexible display unit 151 as shown in FIG. 2B. The case 200 may be implemented to be bent together with the flexible display unit 151 by the external physical force, in consideration of the characteristics of the flexible display unit 151.

As described above, the control unit 180 may generate a control signal related to a function of the mobile terminal 100, corresponding to the bending information of the flexible display unit 151.

Hereinafter, a method of controlling the mobile terminal in relation to the bending information of the flexible display unit, particularly, information on a time for which the bending of the flexible display unit is maintained will be described in detail with reference to the accompanying drawings.

Figure 3:
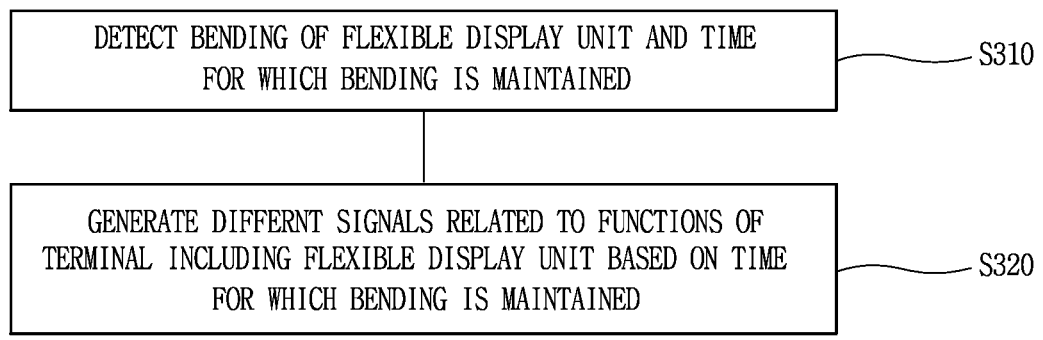
FIG. 3 is a flowchart illustrating a control method of generating a control signal using the flexible display in the mobile terminal according to an embodiment of the present invention.
Figure 4C:
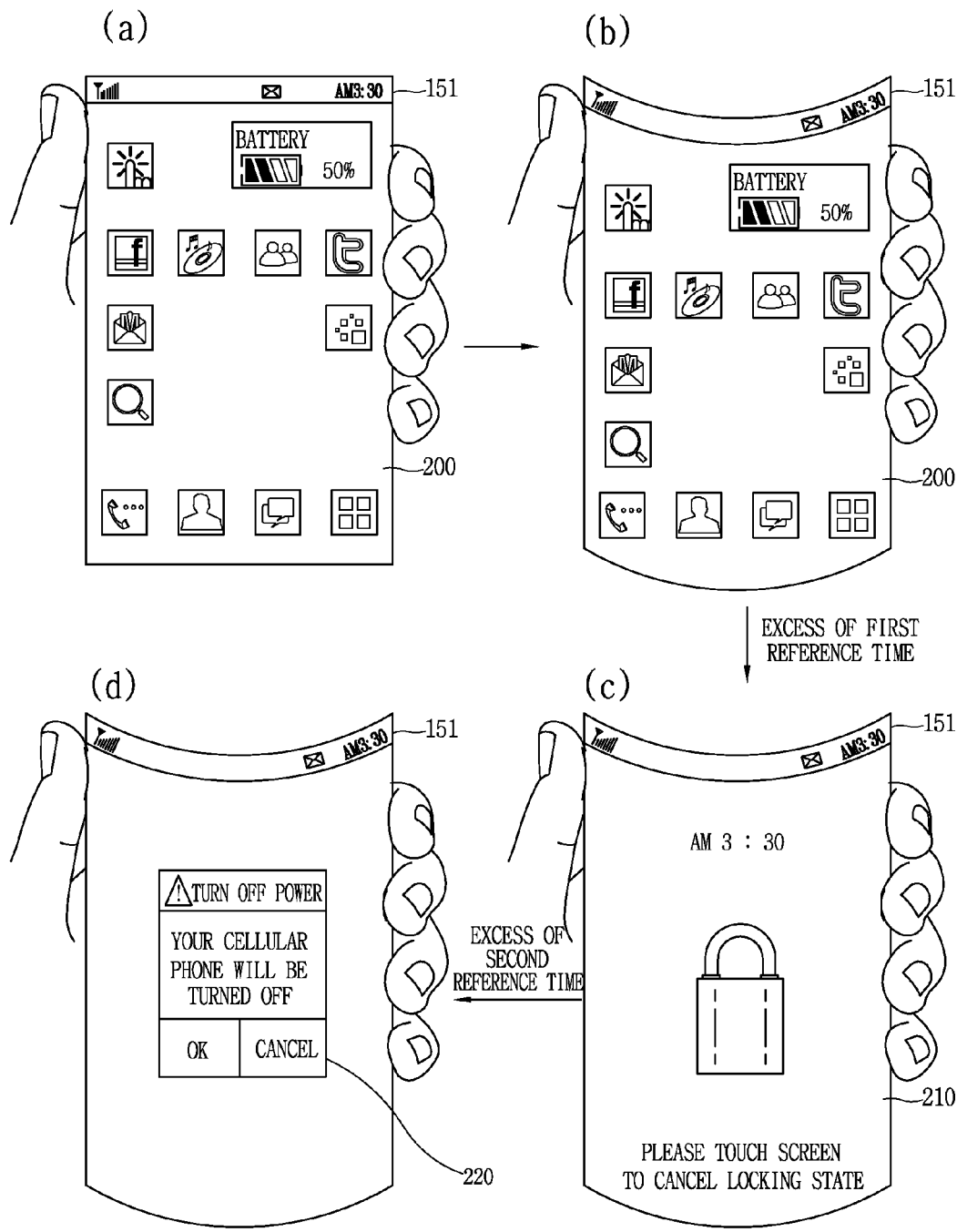

Next, FIG. 3 is a flowchart illustrating a control method of generating a control signal using the flexible display in the mobile terminal according to an embodiment of the present invention. FIGS. 4A, 4B and 4C are conceptual diagrams illustrating the control method of FIG. 3.

First, when an external physical force is applied on the flexible display unit 151 (see FIG. 2A), the detection unit 181 (see FIG. 1) detects bending of the flexible display unit 151 and detects a time for which the bending is maintained (S310). Here, the external physical force applied on the flexible display unit 151 may be applied by a user or an object other than the user.

If the bending of the flexible display unit 151 and the time for which the bending is maintained are detected by the detection unit 181 in step S310, the control unit 180 generates different control signals related to functions of the mobile terminal including the flexible display unit 151, based on the time for which the bending of the flexible display unit 151 is maintained (S320).

Here, the control signals related to the 'functions of the mobile terminal including the flexible display unit' are control signals for controlling the mobile terminal 100. Therefore, in the mobile terminal according to the embodiments, the function according to the control signal generated corresponding to the bending of the flexible display unit 151 may be performed. Further, the control unit 180 generates different control signals, corresponding to different times for which the bending is maintained. Thus, in the mobile terminal according to the embodiments, different functions can be performed using only the bending of the flexible display unit 151.

That is, the control unit 180 may generate a first control signal related to a first function when the bending of the flexible display unit 151 is maintained for a first reference time, and may generate a second control signal related to a second function when the bending of the flexible display unit 151 is maintained for a second reference time.

As such, the function corresponding to the control signal generated according to the bending of the flexible display unit 151 and the time for the bending is maintained may be performed when the bending of the flexible display unit 151 is restored, i.e., when the flexible display unit 151 returns to the original state. If the time for the bending of the flexible display unit 151 is maintained corresponds to only the predetermined reference time even though the bending of the flexible display unit 151 is not restored, the control unit 180 may perform the function according to the control signal.

For example, if a physical force is applied on the flexible display unit 151 as shown in FIG. 4A (b) in the state in which a home screen page (or menu screen) 200 is displayed on the flexible display unit 151 as shown in FIG. 4A (a), the detection unit 181 detects bending of the flexible display unit 151 and a time for the bending is maintained.

When the time for which the bending is maintained corresponds to the first reference time as shown in FIG. 4A (c), the control unit 180 may generate a control signal that allows a locking state (referring to a locking screen 210) to be performed on the flexible display unit 151 of the mobile terminal.

Here, the locking state is used to restrict a user's input of a control command for applications. In this state, although a touch applied by the user is input on the flexible display unit 151, the control command is not generated based on the touch.

When the time for which the bending of the flexible display unit 151 is maintained corresponds to the second reference time different from the first reference time described in FIG. 4A in the state in which the home screen page (or menu screen) 200 is displayed on the flexible display unit 151 as shown in FIGS. 4B (a) and (b), the control unit 180 may generate a control signal for turning off power of the mobile terminal (see a popup window 210), as shown in FIG. 4B (c).

That is, the control unit 180 may generate different control signals corresponding to different functions according to a degree of the time for which the bending of the flexible display unit 151 is maintained.

Meanwhile, the control signal corresponding to the function that can be performed based on the bending of the flexible display unit 151 and the time for which the bending is maintained may be changed depending on information displayed on the flexible display unit 151 at a time point at which the bending is detected, a kind of activated application or which event occurs.

Therefore, the control unit 180 may allow different control signals to be respectively matched to different functions, based on the time for which the bending of the flexible display unit 151 is maintained and state information of the mobile terminal at the time point at which the control signal is generated, and such matching information may be stored in the memory (see FIG. 1). Here, the state information of the mobile terminal may be information displayed on the flexible display unit 151, a kind of activated application or an event occurred at a time point at which the bending is detected or at a time point at which the control signal is generated corresponding to the bending.

As such, the control unit 180 may search for a function corresponding to the time for which the bending is maintained and the state information of the mobile terminal, detected by the detection unit 181, and generate a control signal so that the searched function can be performed.

As shown in FIGS. 4A and 4B, the control unit 180 may perform the function corresponding to the control signal generated, based on that the bending of the flexible display unit 151 is detected and the detection is maintained for a reference time, when the bending of the flexible display unit 151 is restored. Alternatively, as shown in FIG. 4C, the control unit 180 may perform the function corresponding to a predetermined reference time (e.g., a first or second reference time), based on that the bending of the flexible display unit 151 is maintained for the predetermined reference time, regardless of the restoration of the bending of the flexible display unit 151.

Therefore, when the time for which the bending of the flexible display unit 151 is maintained exceeds the first reference time as shown in FIGS. 4C (a) and (b), the control unit 180 may perform a locking state as shown in FIG. 4C (c). Continuously, when the time for which the bending of the flexible display unit 151 is maintained exceeds the second reference time via the first reference time, the control unit 180 may perform a function related to the power of the mobile terminal as shown in FIG. 4C (d).

Figure 4D:
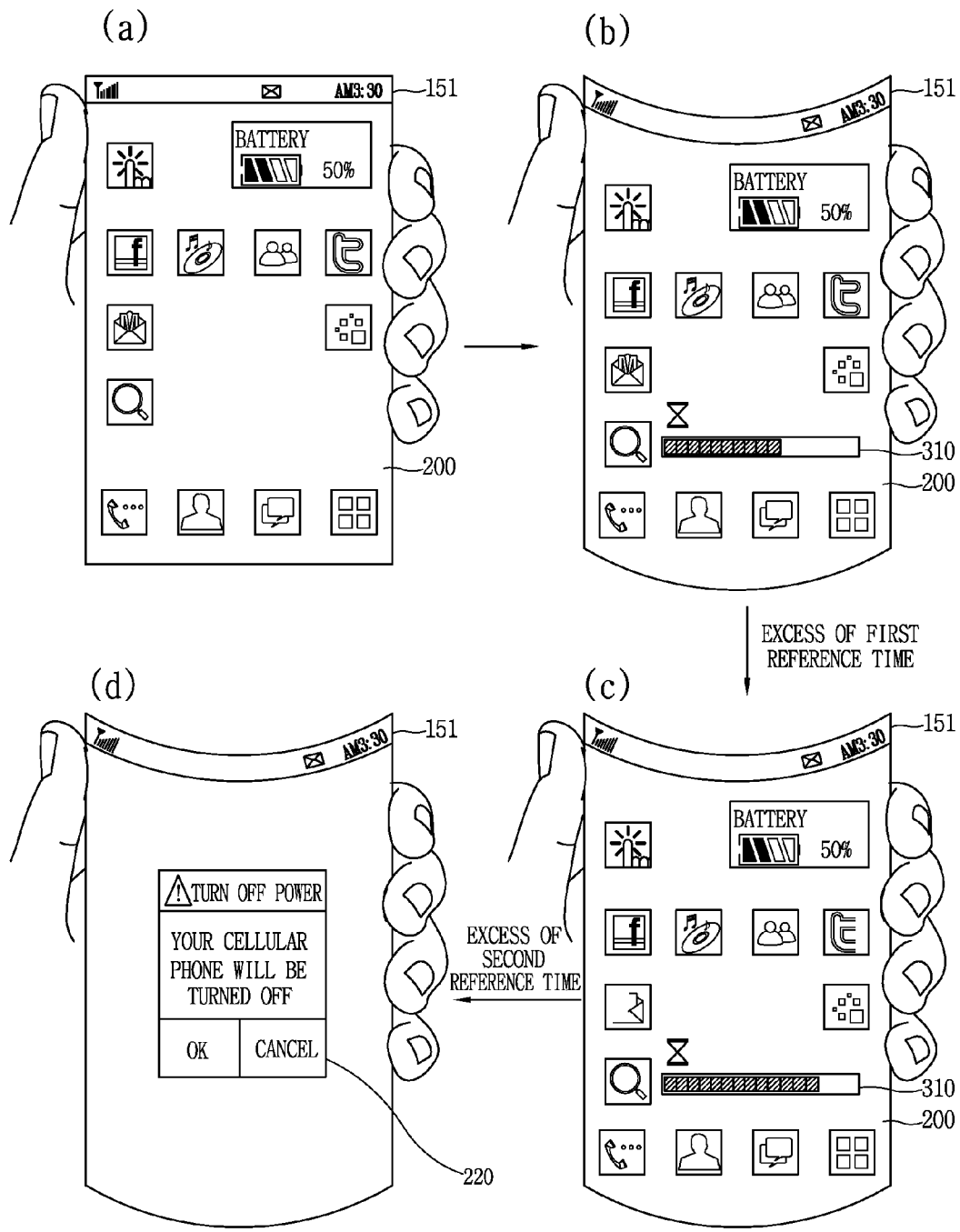

Meanwhile, in the mobile terminal according to the embodiments, the control unit 180 may inform a user that the time for which the bending of the flexible display unit 151 is maintained is counted in the mobile terminal using visual or voice information, based on the bending of the flexible display unit 151. For example, as shown in FIGS. 4D (*a*), (*b*) and (*c*), the control unit 180 counts a time for which the bending is maintained, based on the bending of the flexible display unit 151, and outputs the counted time on the flexible display unit 151.

Thus, the user can see that the first or second reference time is counted, and can see how further the bending of the flexible display unit 151 is necessarily maintained so that a desired function is performed.

Meanwhile, as shown in these figures, counting time information may be displayed as a relationship between a reference time and an actually counted time through a progress bar 310 or another image or text. In addition, information on the actually counted time may be displayed using various images (e.g., a sandglass, etc.) or texts.

In addition to the examples described above, the control unit 180 may display a bending time of the flexible display unit 151 and a predetermined reference time using various methods so that the user can recognize the bending time of the flexible display unit 151 and the predetermined reference time.

Meanwhile, if the bending of the flexible display unit 151 is detected by the detection unit 181 regardless of the position at which the bending of the flexible display unit 151 is sensed, the control unit 180 may control the detection unit 181 to detect the time for which the bending is maintained. Alternatively, the control unit 180 may control the detection unit 181 so that a control signal is generated corresponding to the bending of the flexible display unit 151 based on a predetermined region or predetermined reference axis on the flexible display unit 151.

Figure 4E:
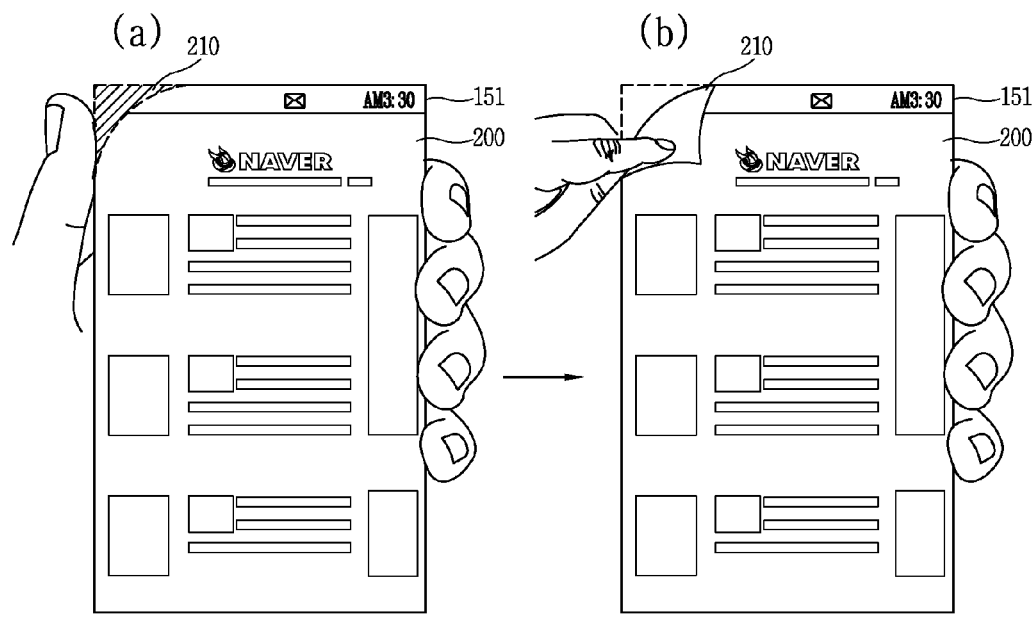

For example, as shown in FIGS. 4E (*a*) and (*b*), the control unit 180 may generate a control signal on a predetermined first region 210, based on that the bending of the flexible display unit 151 is detected. The predetermined region may be formed with one region as shown in these figures, or may be calmed with a plurality of regions. When the predetermined region is formed with a plurality of regions, the control unit 180 may allow different functions to be respectively mapped to the plurality of regions, so that the control signals corresponding to the functions can be generated on the plurality of regions, respectively.

Figure 4F:
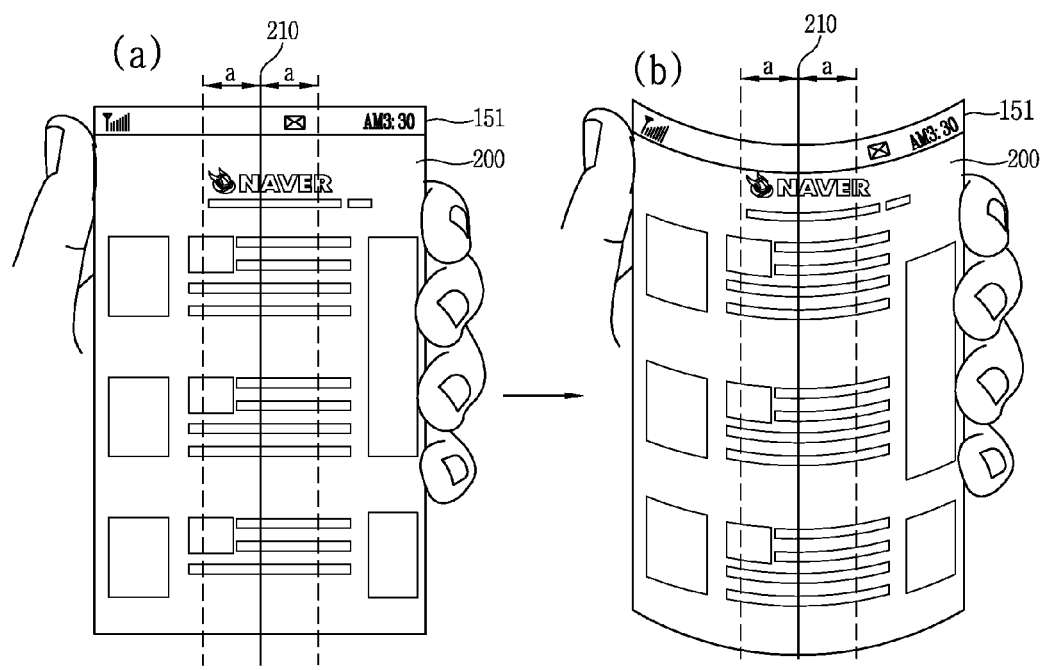

As shown in FIGS. 4F (*a*) and (*b*), the detection unit 181 may detect that the bending of the flexible display unit 151 is made, based on a predetermined virtual reference axis 210, and the control unit 180 may generate a control signal only when the bending is made based on the reference axis 210.

Meanwhile, the position of the predetermined region or reference axis described above may be changed to an arbitrary position depending on a user's setup. In this case, the control signal may not be generated even though the flexible display unit 151 is bent in a region that is not the predetermined region.

The control unit 180 may output at least one of information on the predetermined region, time and function, which cause the control signal to be generated, on the flexible display unit 151 so that the user can recognize the at least one of information on the predetermined region, time and function.

Figure 4G:
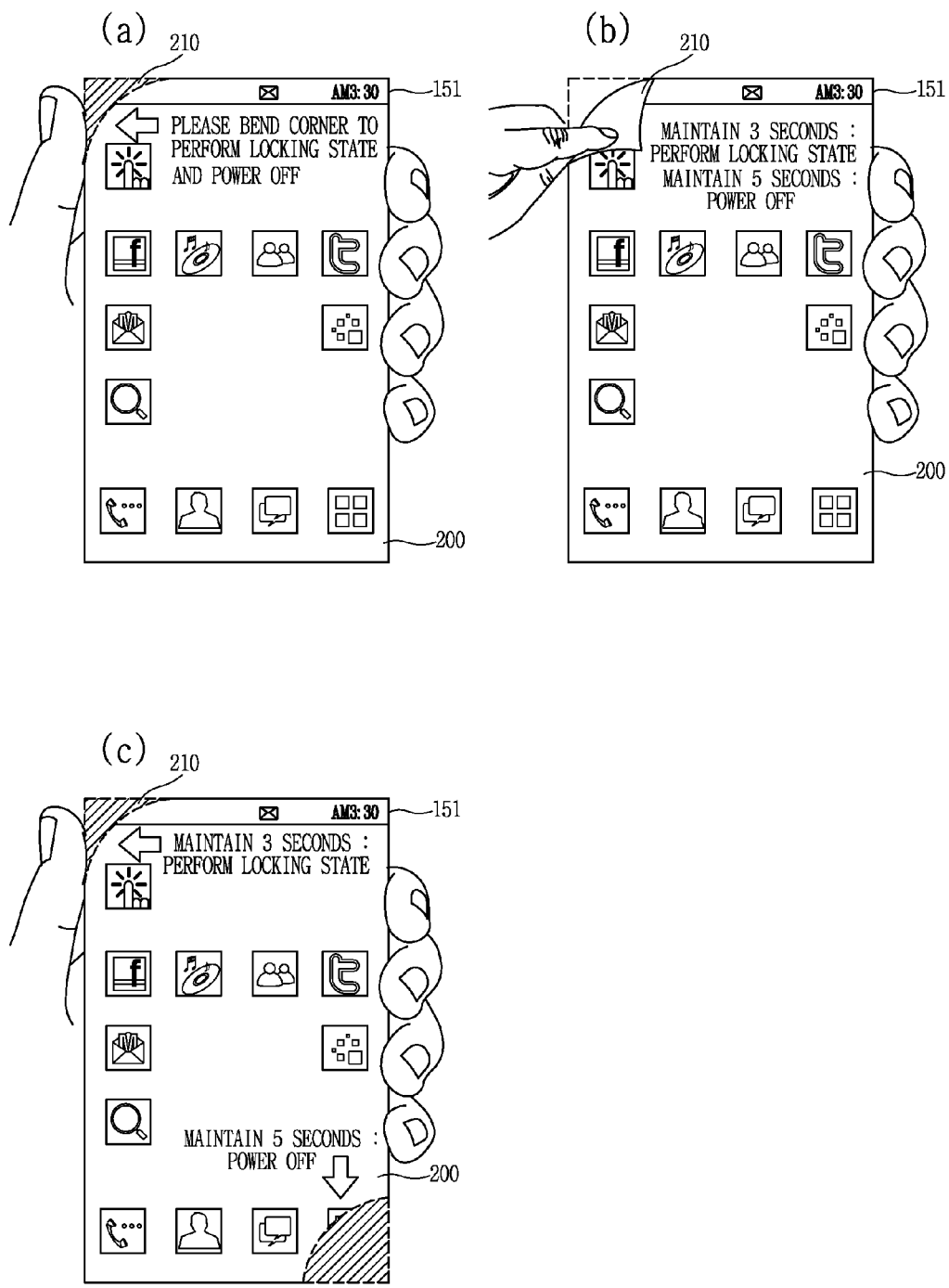

For example, as shown in FIG. 4G (*a*), the control unit 180 may display the predetermined region 210 that causes the control signal related to the function of the mobile terminal so that the predetermined region 210 is distinguished from other regions. The control unit 180 may output information on a function that can be performed by the bending of a predetermined region 210 on the flexible display unit 151 using visual or voice information.

As shown in FIG. 4G (*b*), the control unit 180 may control the flexible display unit 151 so that notification information on the function that can be performed, in response to the bending of an arbitrary region or predetermined region on the flexible display unit 151.

As shown in this figure, if one region of the flexible display unit 151 is bent, the control unit 180 may provided the user with information on functions according to different times at which the bending is maintained, such as 'Maintain bending for 3 seconds: perform locking state, or Maintain bending for 5 seconds: power off.' Thus, the user can properly use a desired function through the information output on the flexible display unit 151.

When different functions are, respectively, mapped to different regions of the flexible display unit 151, the control unit 180, as shown in FIG. 4G (*c*), may provide the user with visual or auditory information so that the user can recognize regions 210 and 220 to which the respective functions are mapped and function information, bending direction information and time information corresponding to the regions 210 and 220.

Meanwhile, although the bending of the flexible display unit 151 is detected, the control unit 180 may not generate a control signal when the time at which the bending is detected is less than a predetermined reference time. This is provided to prevent an unnecessary control signal from being generated when a physical force is applied to the flexible display unit 151 in spite of a user's intention.

As described above, in the mobile terminal according to the embodiments, the control signal related to the function of the mobile terminal can be generated using the characteristic in which the flexible display unit 151 is bent corresponding to the physical force applied from the outside and the time for which the bending is maintained. Thus, it is possible to reduce user's inconvenience caused by applying a separate touch on the flexible display unit 151 so as to generate a control signal.

Hereinafter, a method of performing various functions related to an event occurring in the mobile terminal, using the bending of the flexible display unit, will be described with reference to the accompanying drawings. FIGS. 5A, 5B, 6A, 6B and 6C are conceptual diagrams illustrating a method of generating a control signal through the flexible display unit corresponding to an event in the mobile terminal according to an embodiment of the present invention.

The control unit 180 of the mobile terminal 100 may control the detection unit 181 to detect the bending of the flexible display unit 151 and the time for which the bending is maintained, in response to that an event occurs in at least one of a plurality of applications. That is, the control unit 180 may generate a control signal corresponding to a function that can be performed in relation to the event occurring in the mobile terminal, based on the bending of the flexible display unit 151.

Figure 5A:
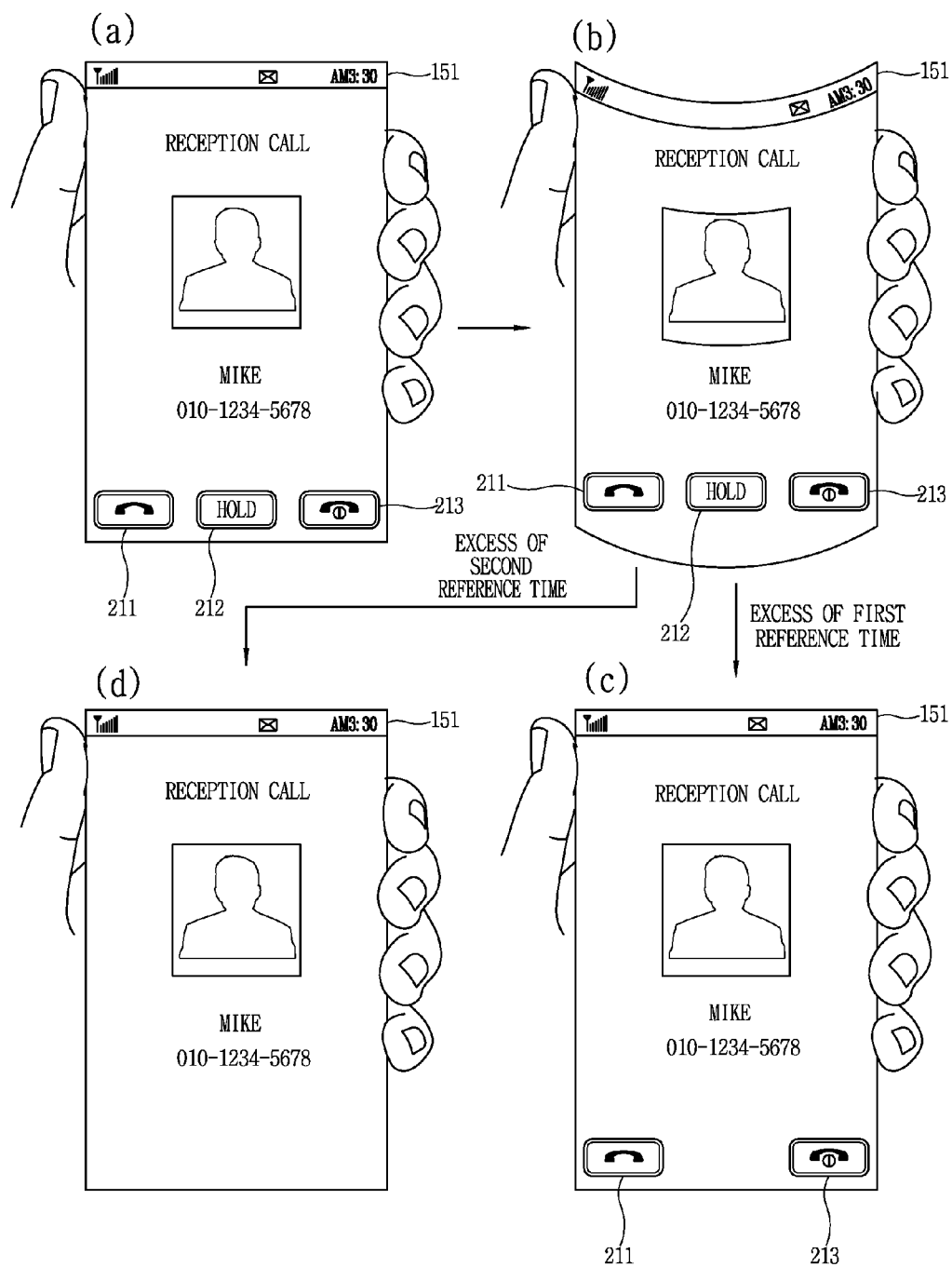

As an example, when the flexible display unit 151 is bent by an external physical force as shown in FIG. 5A (*b*) in the state in which a 'call event' occurs in the mobile terminal as shown in FIG. 5A (*a*), the control unit 180 controls the detection unit 181 to detect the time for which the bending is maintained.

When the time for which the bending of the flexible display unit 151 is maintained exceeds a first reference time as shown in FIG. 5A (c), the control unit 180 generates a control signal corresponding to a predetermined first function mapped to the first reference time among functions related to the 'call event.' When the bending of the flexible display unit 151 is restored as shown in FIG. 5A (c), the control unit 180 performs a function corresponding to the generated control signal. Here, the first function may be a function of 'reception holding' as shown in this figure.

When the time for which the bending of the flexible display unit 151 is maintained exceeds a second reference time different from the first reference time as shown in FIG. 5A (d), the control unit 180 generates a control signal corresponding to a predetermined second function matched to the second reference time among the functions related to the 'call event.' When the bending of the flexible display unit 151 is restored as shown in FIG. 5A (d), the control unit 180 performs a function corresponding to the generated control signal. Here, the second function may be a function of 'reception rejection' as shown in this figure.

As another example, when the bending of the flexible display unit 151 is maintained for the first reference time in response to the 'call event (or call reception event),' the control unit 180 may perform a call reception function so that a call corresponding to the call reception event can be received. When the bending of the flexible display unit 151 is maintained for the second reference time different from the first reference time, the control unit 180 may perform a message function so that a message can be transmitted to an external terminal corresponding to the call reception event. As such, the function that can be performed corresponding to the event occurring in the mobile terminal and the bending of the flexible display unit 151 may be variously set, and the user may separately set the function corresponding to the bending of the flexible display unit 151 and the time for which the bending is maintained.

Here, the first and second functions may be functions related to functional icons 211, 212 and 213 output corresponding to the occurrence of the 'call event' shown in FIG. 5A (a), and may be functions different from the functions corresponding to the functional icons 211, 212 and 213.

The control unit 180 may also inform the user of the function that can be performed, based on that the flexible display unit 151 is bent for the predetermined time or more, by outputting notification information (voice or visual information). Further, the control unit 180 may provide counting time information using an image, popup window, text or voice so that the user can recognize that the first or second reference time is counted based on the bending of the flexible display unit 151.

Figure 5B:
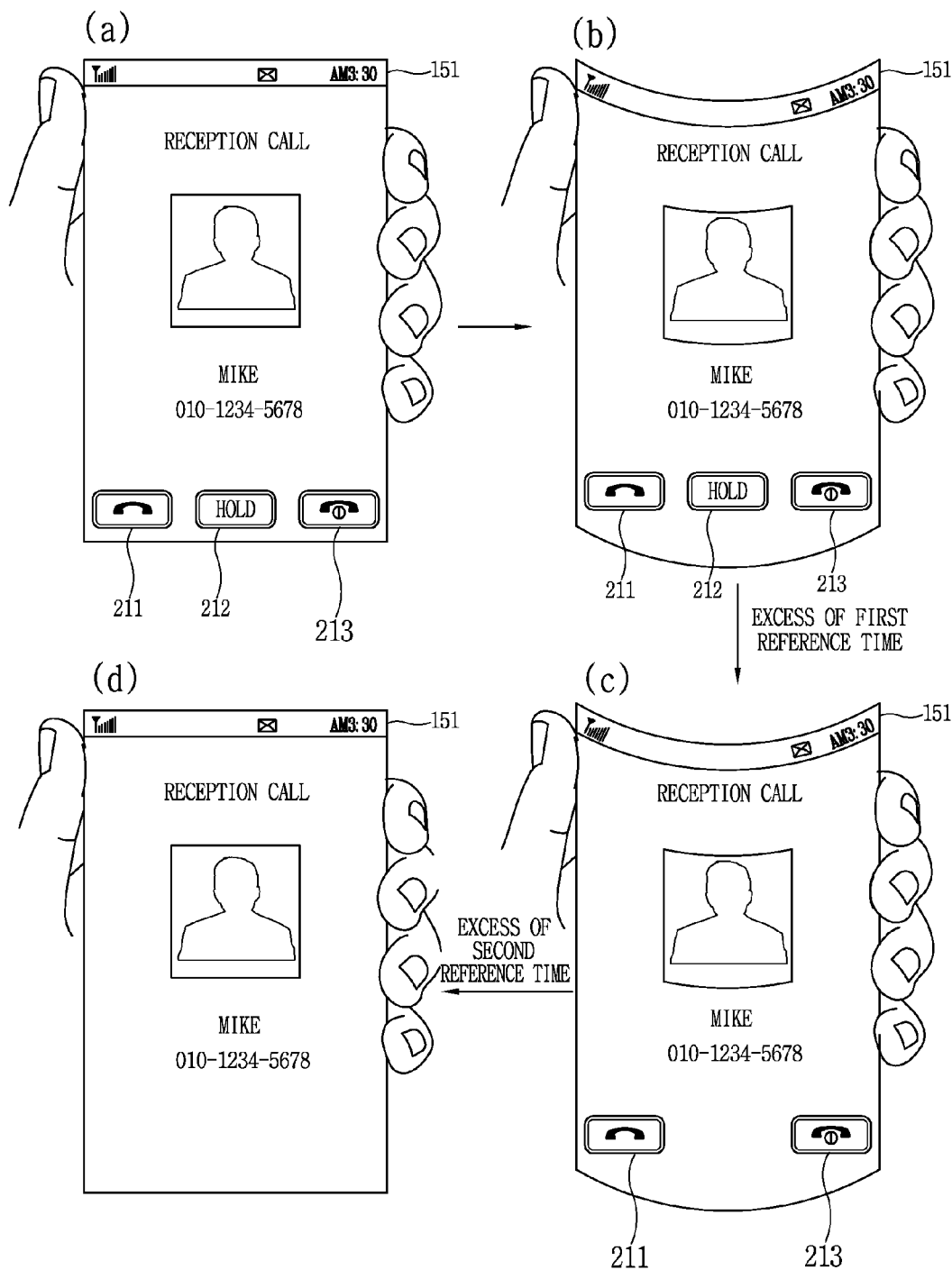

The control unit 180, as shown in FIG. 5B, may sequentially perform a function corresponding to a predetermined reference time (e.g., first or second reference time) based on that the bending of the flexible display unit 151 is maintained for the predetermined reference time, regardless of the restoration of the bending of the flexible display unit 151.

For example, when the 'call event' occurs and the time for which the bending of the flexible display unit 151 is maintained exceeds the first reference time as shown in FIGS. 5B (a) and (b), the control unit 180 may perform the function of 'reception holding,' which holds the reception of a call, as shown in FIG. 5B (c). When the bending of the flexible display unit 151 exceeds the second reference time via the first reference time, the control unit 180 may perform the function of 'reception rejection,' which finishes the reception of the call, as shown in FIG. 5B (d).

As described above, in the mobile terminal according to the embodiments, when the bending of the flexible display unit is maintained for a predetermined time after an event occurs in the mobile terminal, a function related to the occurrence of the event can be performed, and further, different functions related to the event can be performed using different times for which the bending is maintained. Thus, to perform the function related to the event, the user can simply control the function of the mobile terminal using only the bending of the flexible display unit, without applying a touch input on the flexible display unit and selecting the function.

Hereinafter, a method of controlling the mobile terminal using the bending of the flexible display unit when an event occurs in the mobile terminal and a popup window for informing that the event has occurred is output will be described. When an event occurs in the mobile terminal according to the embodiments, the control unit 180 may output a popup window 200 for informing that the event has occurred as shown in FIG. 6A (a).

In the state in which the popup window 200 is output, the control unit 180 may control an output state of the popup window 200 or perform a function correspond to the occurrence of the event, in response to the bending of the flexible display unit 151.

For example, when the bending of the flexible display unit 151 is detected in the state in which the popup window 200 is output as shown in FIG. 6A (a) and (b), the control unit 180 may control the detection unit 181 to detect the time for which the bending of the flexible display unit 151 is maintained. Then, the control unit 180 may generate control signals corresponding to different functions, based on different times for which the bending of the flexible display unit 151 is maintained. Here, the different functions corresponding to the different times for which the bending is maintained may be previously matched and stored in the memory 160 as described above.

If the popup window 200 is output in response to that the event of 'message reception' as shown in FIG. 6A (a) and the bending of the flexible display unit 151 is detected by the detection unit 181 as shown in FIG. 6A (b), the control unit 180 controls the detection unit 181 to count the time for the bending is maintained.

If the bending of the flexible display unit 151 is restored after the time for which the bending is maintained exceeds the first reference time as shown in FIG. 6A (c), the control unit 180 finishes outputting the popup window 200 and continuously outputs the information output on the flexible display unit 151 before the event occurs.

When the time for which the bending of the flexible display unit 151 corresponds to the second reference time different from the first reference time as shown in FIG. 6A (d), the control unit 180 generates a control signal for displaying the content of a message corresponding to the event of 'message reception.' When the bending of the flexible display unit 151 is restored by outputting a message window 300 as shown in FIG. 6A (d), the control unit 180 may perform a function corresponding to the generated control signal.

In the mobile terminal according to the embodiments, the detection unit 181 may detect a bending direction of the flexible display unit 151 and perform different functions according to the detected bending direction.

Figure 6B:
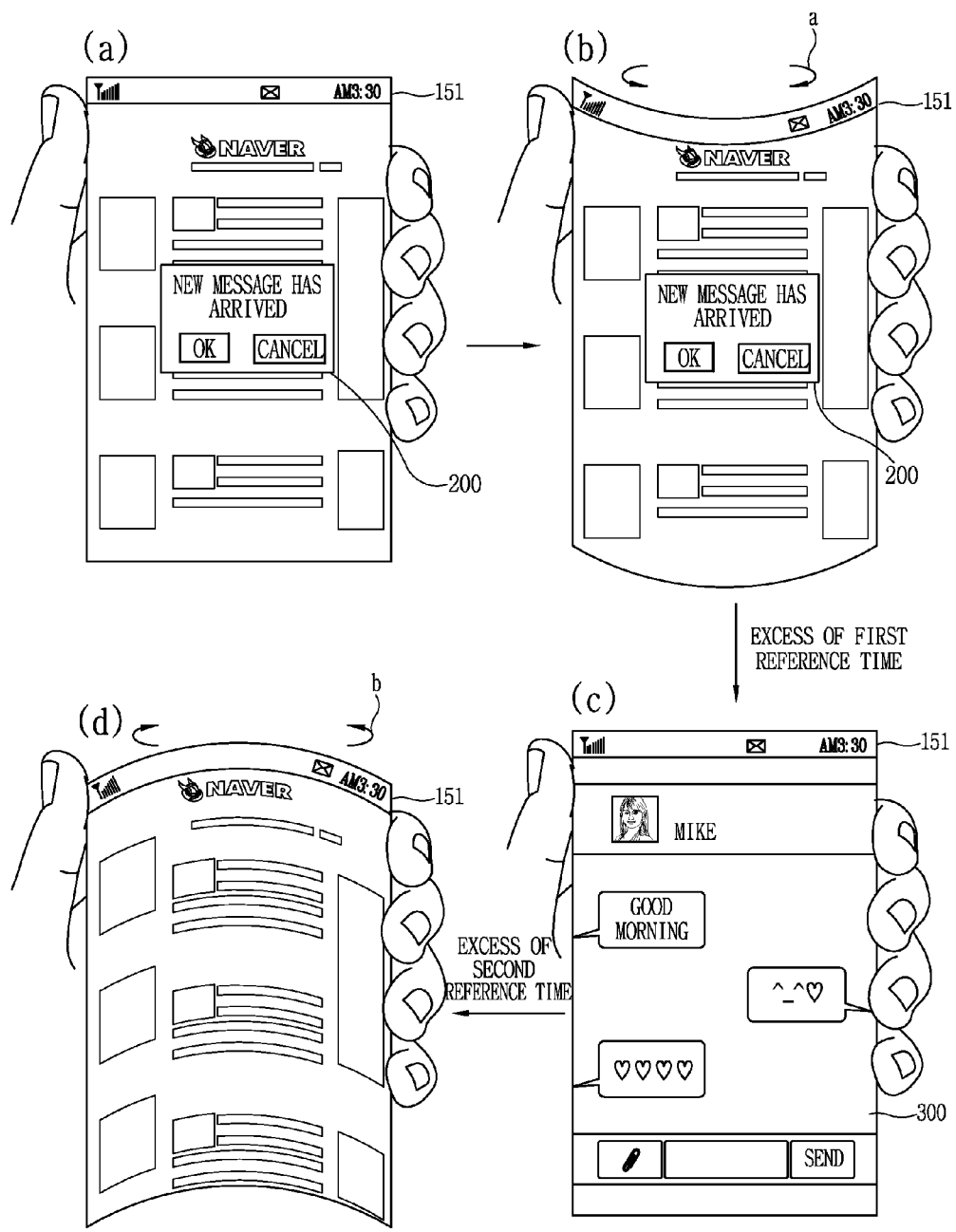

For example, when the flexible display unit 151 is bent in a first direction 'a' as shown in FIGS. 6B (a) and (b), the control unit 180 performs the function related to the event occurring in the mobile terminal, based on the time for which the bending of the flexible display unit 151 is maintained, as described in FIG. 6A. As an example, when the time for which the bending of the flexible display unit 151 corresponds to the first reference time, the control unit 180 may output the message window 300 on the flexible display unit 151 as shown in FIG. 6B (*c*).

When the flexible display unit 151 is bent in a second direction 'b' different from the first direction 'a' as shown in FIG. 6B (*d*), the control unit 180 may control the flexible display unit 151 so that the popup window 200 output on the flexible display unit 151 is not output. Further, the control unit 180 may provide counting time information using an image, popup window, text or voice so that the user can recognize that the first or second reference time is counted, based on the bending of the flexible display unit 151.

As such, in the mobile terminal according to the embodiments of the present invention, various control signal can be generated using the bending characteristic of the flexible display unit 151, by matching functions related to the mobile terminal not only to the time for which the bending of the flexible display unit 151 is maintained but also to the bending direction of the flexible display unit 151.

Meanwhile, in the mobile terminal according to the embodiments, information displayed in the mobile terminal may be changed according to the time for which the bending of the flexible display unit 151 is maintained. For example, if a popup window 200 is output in response to the occurrence of an event of 'message reception' as shown in FIG. 6C (*a*) and the bending of the flexible display unit 151 is detected by the detection unit 181 as shown in FIG. 6C (*b*), the control unit 180 controls the detection unit 181 to count the time for which the bending is maintained.

Figure 6C:
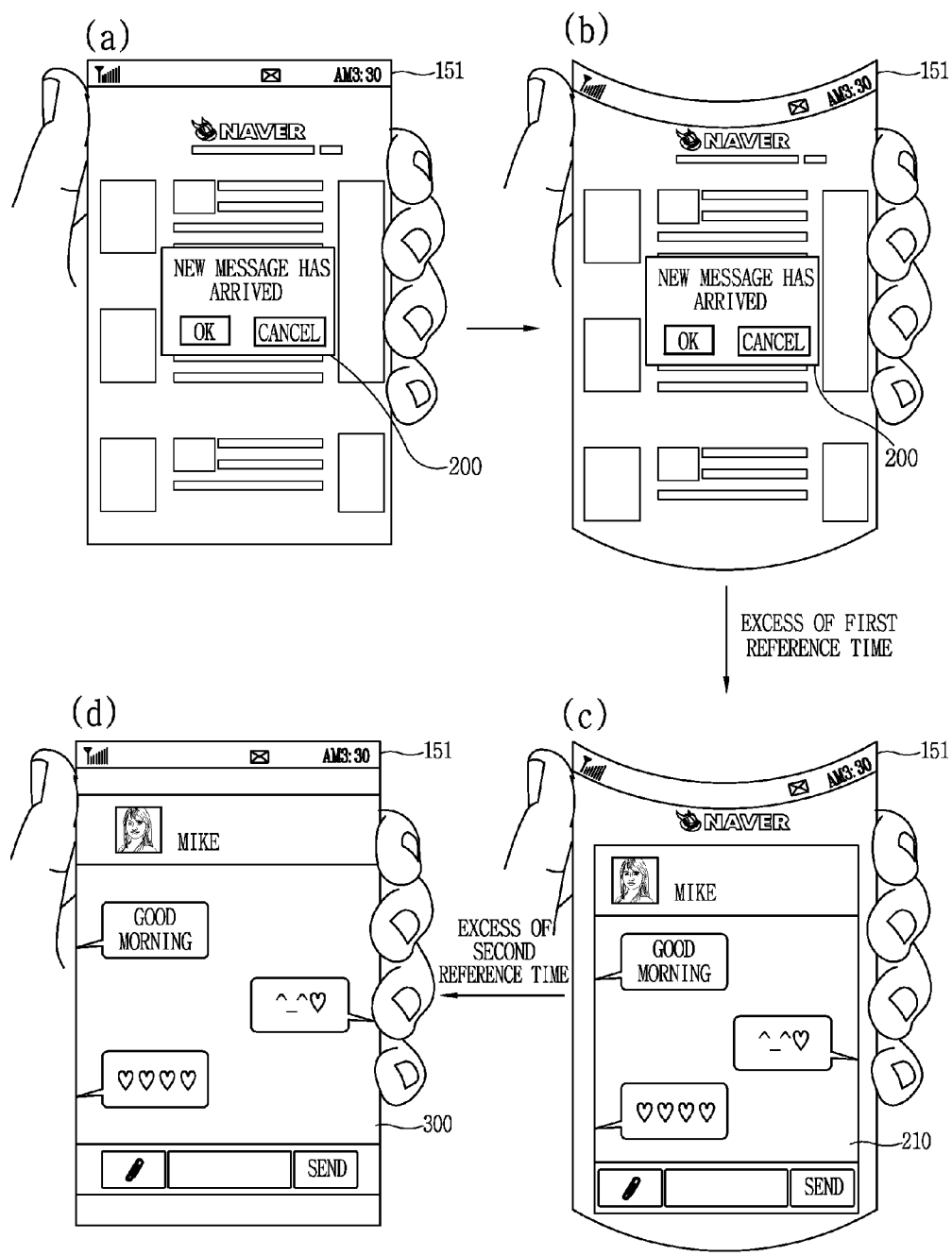

If the time for which the bending of the flexible display unit 151 exceeds the first reference time as shown in FIG. 6C (*c*), the control unit 180 outputs a preview screen 210 so that the content of a message corresponding to the event is output on the flexible display unit 151. Here, the preview screen 210 may be overlapped with the screen image output on the flexible display unit 151 before the event occurs.

If the time for which the bending of the flexible display unit 151 exceeds the second reference time via the first reference time, the control unit 180 may control the flexible display unit 151 so that an execution screen 300 corresponding to the event is entirely output on the flexible display unit 151.

Meanwhile, if the bending of the flexible display unit 151 is finished before the second reference time elapses via the first reference time, the preview screen 210 may disappear on the flexible display unit 151.

If the bending of the flexible display unit 151 is finished after the second reference time elapses, the control unit 180 may finish the output of the execution screen corresponding to the event or continuously maintains the output of the execution screen. When the output of the execution screen is finished, the control unit 180 may continuously output the information output on the flexible display unit 151 before the execution screen is output.

As described above, in the mobile terminal according to the embodiments, the preview screen or execution screen is displayed according to the time for which the bending of the flexible display unit is maintained, so that although the user does not execute an application corresponding to the event, the user can simply identify the content of the event through the preview screen.

Figure 7A:
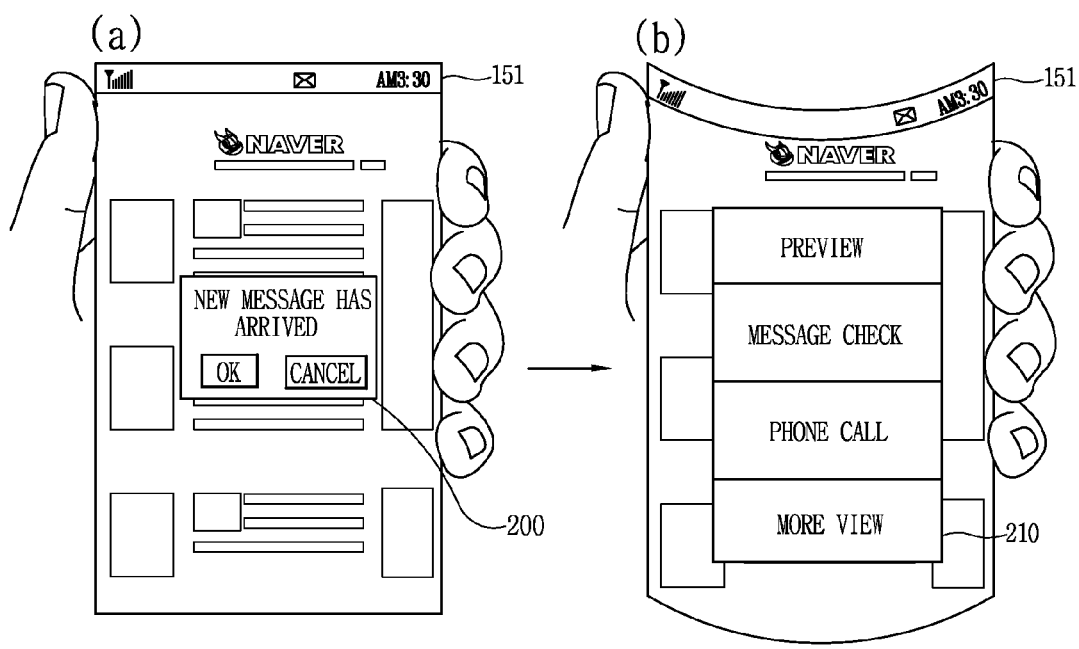
FIGS. 7A and 7B are conceptual diagrams illustrating a method of changing notification information corresponding to bending of the flexible display unit in the mobile terminal according to an embodiment of the present invention.
Figure 7B:
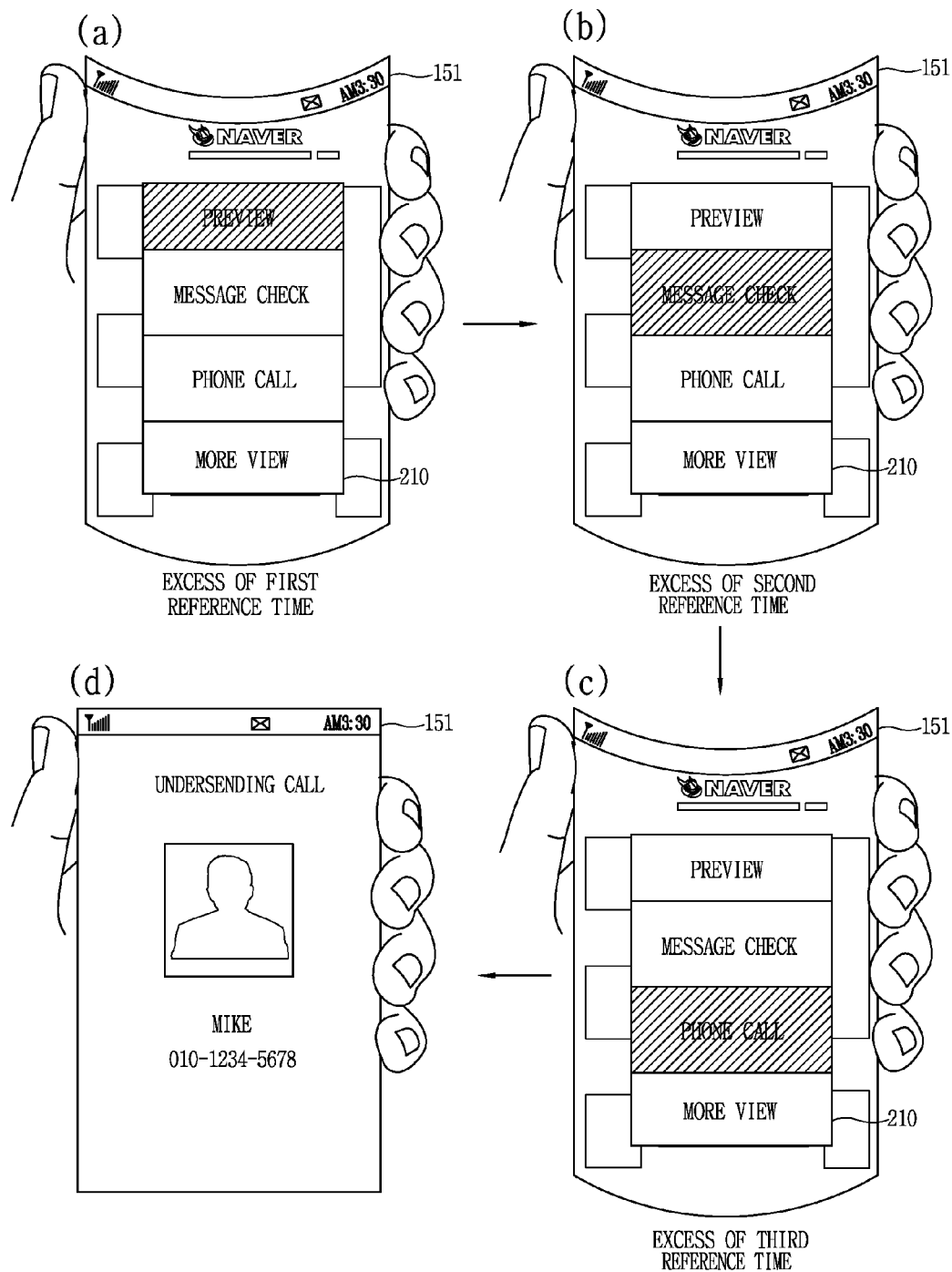

Hereinafter, a method of informing a user of information on functions that can be performed according to the bending of the flexible display unit in the mobile terminal according to the embodiments will be described with reference to the accompanying drawings. FIGS. 7A and 7B are conceptual diagrams illustrating a method of changing notification information corresponding to bending of the flexible display unit in the mobile terminal according to an embodiment of the present invention.

In the mobile terminal according to the embodiments, functional icons (or items) corresponding to functions related to information displayed on the flexible display unit may be displayed in response to the bending of the flexible display unit or user's selection.

For example, if an event of 'message reception' occurs in the mobile terminal as shown in FIG. 7A (*a*) and the bending of the flexible display unit 151 is detected as shown in FIG. 7A (*b*), the control unit 180 may control the flexible display unit 151 so that a plurality of items 210 respectively corresponding to functions that can be performed corresponding to the event of 'message reception' are output on the flexible display unit 151.

The control unit 180 may control the flexible display unit 151 so that functional icons (or items) related to the information output on the flexible display unit 151, in response to the detected bending of the flexible display unit 151, as well as the case in which the event occurs in the mobile terminal.

Meanwhile, if the plurality of items 210 are output on the flexible display unit 151 as described in FIG. 7A, the control unit 180 may generate a control signal for selecting any one of the plurality of items 210 according to a degree of the time for which the bending of the flexible display unit 151 is maintained. When the bending of the flexible display unit 151 is restored to the original state, the control unit 180 may perform a function corresponding to the generated control signal.

Meanwhile, the control signal generated based on the time for which the bending of the flexible display unit 151 is maintained may correspond to the order in which the plurality of items 210 are arranged on the flexible display unit 151. For example, when the bending of the flexible display unit 151 is maintained for the first reference time as shown in FIG. 7B (*a*), the control unit 180 may generate a control signal corresponding to the function of 'preview,' which is firstly disposed among the plurality of items 210. When the bending of the flexible display unit 151 is maintained for the second reference time longer than the first reference time as shown in FIG. 7B (*b*), the control unit 180 may generate a control signal corresponding to the function of 'message check,' which is secondly disposed among the plurality of items 210.

As such, the control unit 180 can determine a function that can be performed corresponding to the time for which the bending of the flexible display unit 151 is maintained among a plurality of functions that can be performed in relation to an event occurring in the mobile terminal or information output in the mobile terminal.

The control unit 180, as shown in FIGS. 7B (*a*), (*b*) and (*c*), may display an item corresponding to the determined function among the plurality of items 210 corresponding to the respective functions so that the item is distinguished from the other items. Here, the method of displaying the item corresponding to the determined function so that the item is distinguished from the other items may be variously implemented by performing magnification or reduction, color changing, flickering display, or transparency changing on the item corresponding to the determined function.

The control unit 180 may re-determine a function that can be performed corresponding to the time changed according to the change in the time for which the bending of the flexible display unit 151 is maintained, and change an item highlighted so that the item corresponding to the re-determined function among the plurality of items 210 is distinguished from the other items.

Thus, the control unit 180 highlights the item of 'preview' when the time for which the bending of the flexible display unit 151 is maintained exceeds the first reference time as shown in FIG. 7B (a), and the control unit highlights the item of 'message check' when the time for which the bending of the flexible display unit 151 is maintained exceeds the second reference time as shown in FIG. 7B (b). When the time for which the bending of the flexible display unit 151 is maintained exceeds a third reference time as shown in FIG. 7B (c), the control unit 180 may highlight an item of 'phone call.'

Meanwhile, when an item corresponding to a function to be performed by the user is highlighted, the control unit 180 may perform the function to be performed by restoring the bending of the flexible display unit 151. Therefore, if the bending of the flexible display unit 151 is restored in the state in which the item of 'phone call' is highlighted as shown in FIGS. 7B (c) and (d), the control unit 180 may perform the function of 'phone call.'

As described above, in the mobile terminal according to the embodiments, the control signal for allowing any one of the plurality of items to be selected can be generated using the fact that the bending of the flexible display unit and the different times for which the bending is maintained. Further, in the mobile terminal according to the embodiments, the item corresponding to the time for which the bending of the flexible display unit is maintained among the plurality of items, so that the user can exactly select the item intended to select among the plurality of items.

Meanwhile, in the mobile terminal according to the embodiment, the control unit 180 may control information output on the flexible display unit 151, based on the bending position, bending direction or bending speed of the flexible display unit 151, as well as the time for which the bending of the flexible display unit 151 is maintained.

Figure 8A:
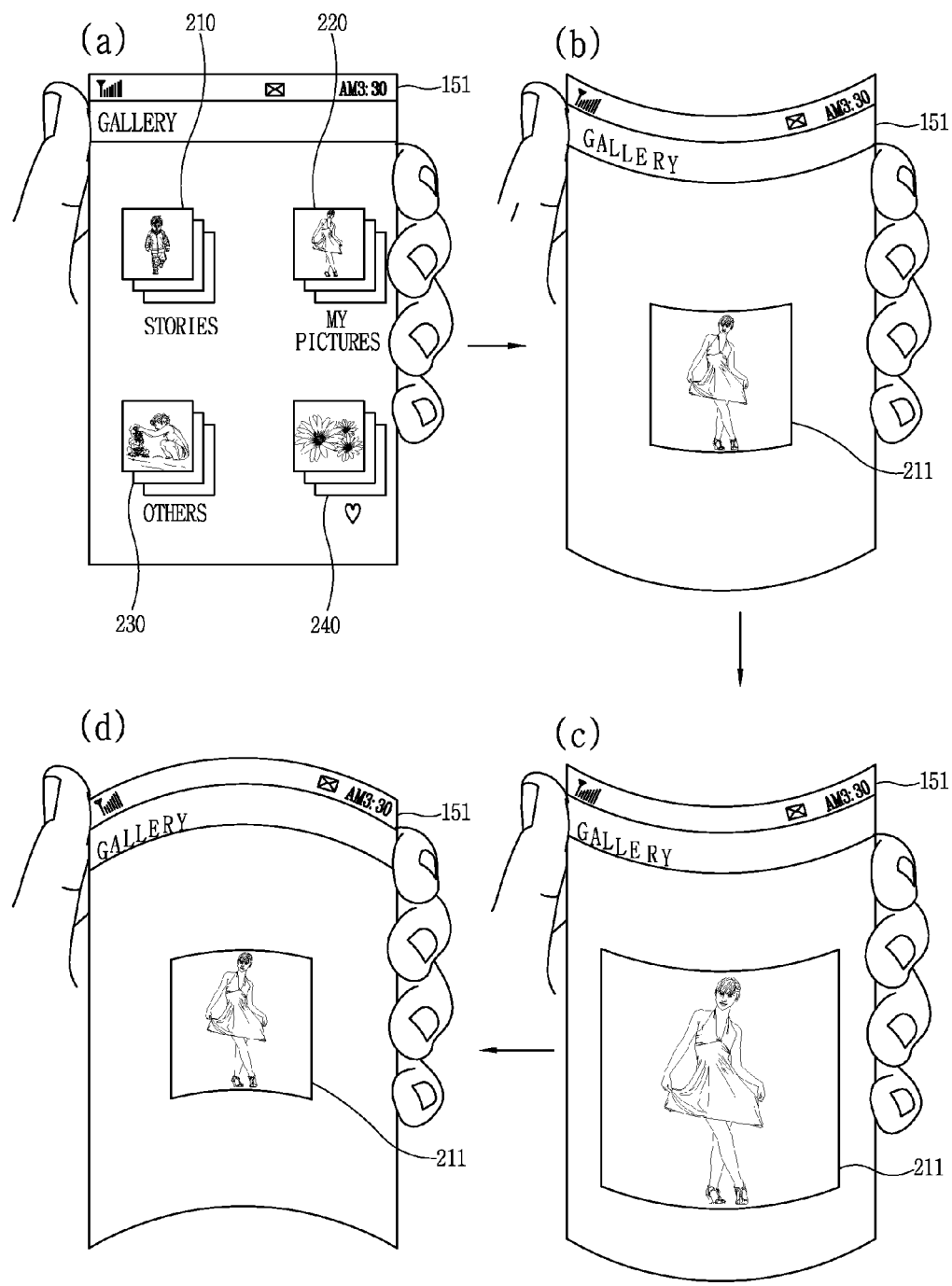
FIGS. 8A and 8B are conceptual diagrams illustrating a method of changing information displayed on the flexible display unit corresponding to bending of the flexible display unit in the mobile terminal according to an embodiment of the present invention.
Figure 8B:
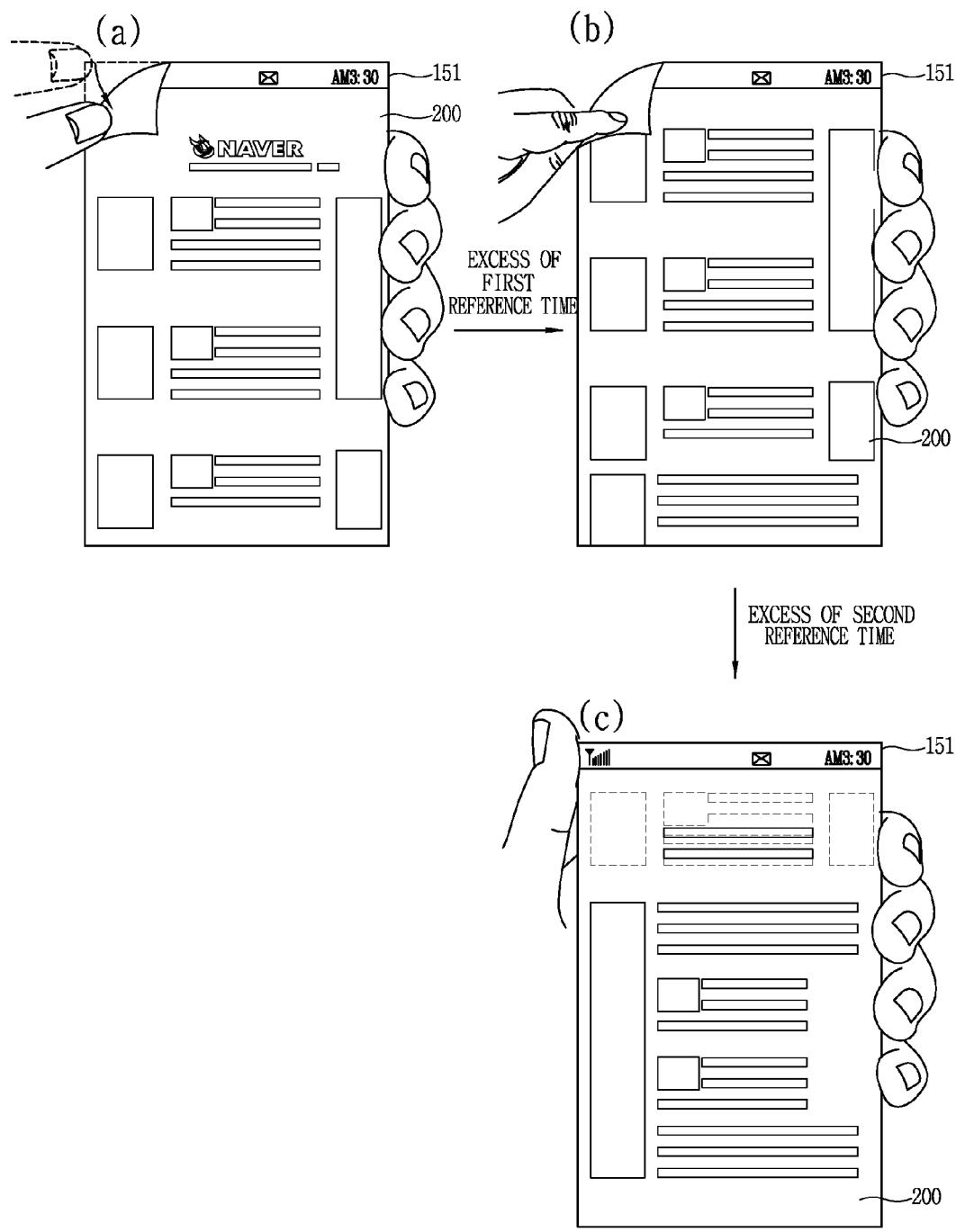

Hereinafter, a method of displaying information corresponding to the bending information of the flexible display unit 151 will be described with the accompanying drawings. FIGS. 8A and 8B are conceptual diagrams illustrating a method of changing information displayed on the flexible display unit corresponding to bending of the flexible display unit in the mobile terminal according to an embodiment of the present invention.

For example, the execution screen of a gallery application that can search and display images stored in the memory 160 are displayed in FIG. 8A (a).

At least one group may exist on the gallery application, and at least one image may be included in each of the groups. As an example, when the groups included in the gallery application are first, second, third and fourth groups 210, 220, 230 and 240 as shown in this figure, the user may select any one of the groups using a touch input for the displayed groups or bending of the flexible display unit 151.

The method of selecting any one of the groups using the bending of the flexible display unit 151 may use the bending time of the flexible display unit 151 as described in FIGS. 7A and 7B. In addition to the method, the user may select any one of the plurality of groups by bending a region on which the group intended to select is displayed.

Meanwhile, if any one of the plurality of groups is selected using the method described above and any one image 211 included in the selected group is output as shown in FIG. 8A (b), the control unit 180 may magnify or reduce the image 211 using the bending information of the flexible display unit 151.

For example, if the bending of the flexible display unit 151 is detected for a predetermined time or more as shown in FIGS. 8A (b) and (c), the control unit 180 may magnify the image 211. If the bending of the flexible display unit 151 is detected in a second direction for the predetermined time or more as shown in FIG. 8B (d), the control unit 180 may reduce the image 211.

The control unit 180 may magnify or reduce the image 211 based on the region on which the bending of the flexible display unit 151 is detected and a region corresponding to the detected region. In addition, the control unit 180 may control a degree of the magnification or reduction of the image 211 according to the bending speed of the flexible display unit 151.

Meanwhile, although the 'image' will be described as an example in the embodiments, this is merely one embodiment, and the control unit may apply all information displayed on the flexible display unit, as well as the 'image,' to the embodiments.

Hereinafter, a method of scrolling information displayed on the flexible display unit using the bending characteristic of the flexible display unit and the time for which the bending is maintained will be described. The control unit 180 may control scrolling amounts of the information displayed on the flexible display unit 151 to be different from each other according to the time at which an arbitrary region or predetermined region of the flexible display unit 151 is bent.

That is, the control unit 180 may control scrolling degrees of the information to be different from each other according to the time at which the bending of the flexible display unit 151 is detected. For example, the control unit 180 may control the scrolling amount of the information when the flexible display unit 151 is bent for the first reference time as shown in FIGS. 8B (a) and (b) to be different from that of the information when the flexible display unit 151 is bent for the first reference time as shown in FIGS. 8B (b) and (c).

Here, the first reference time may be shorter than the second reference time, and the bending of the flexible display unit 151, corresponding to the first reference time, may be an instantaneous bending in a tab method. The control unit 180 may also provide counting time information using an image, popup window, text or voice so that the user can recognize that the first or second reference time is counted based on the bending of the flexible display unit 151.

As described above, in the mobile terminal according to the embodiments, information output on the flexible display unit can be variously controlled using the characteristics of the flexible display unit, without utilizing any touch input.

Hereinafter, a method of converting a locking state of the mobile terminal into a cancellation state of the mobile terminal using the bending characteristic of the flexible display unit and the time for which the bending is maintained will be described.

In the mobile terminal according to the embodiments, it is possible to convert the locking state into the cancellation state using the bending characteristic of the flexible display unit. As an example, the user may set a pattern for converting the locking state into the cancellation state through a description screen as shown in FIG. 9A.

Figure 9A:
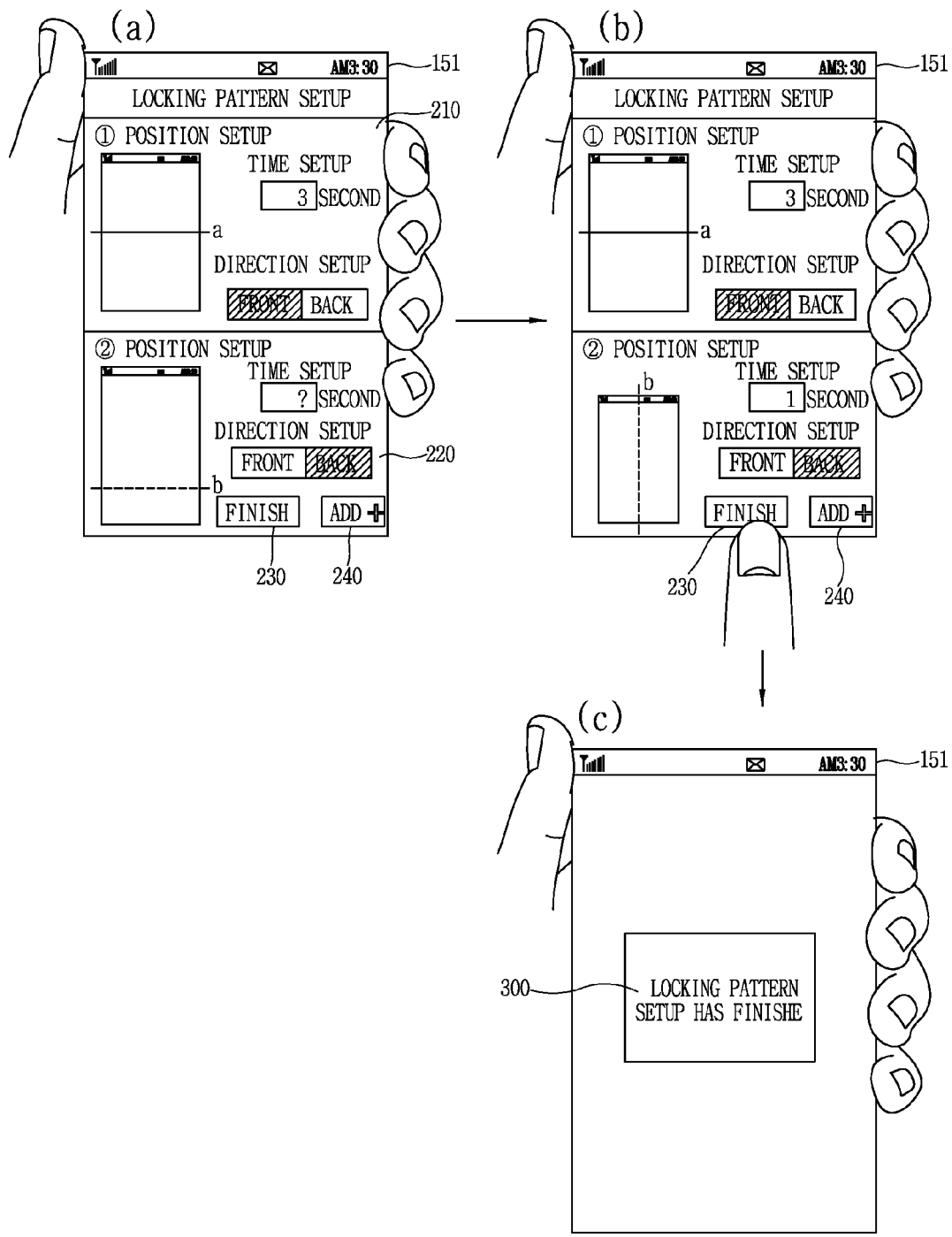

As shown in FIG. 9A (a), the control unit 180 may receive a bending position, bending maintenance time and bending direction of the flexible display unit 151, set through setup windows 210 and 220, so as to cancel the locking state. The user may set a position at which the bending is to be detected, using the guide lines 'a' and 'b' shown in FIG. 9B, and may set at least one bending pattern through an icon 'Add,' etc.

If the setting of the bending pattern for cancelling the locking state is completed as shown in FIGS. 9A (b) and (c), the control unit 180 may store the bending pattern set by the user, and convert the locking state into the cancellation state of the mobile terminal only when the set bending pattern is input from when the next locking state is cancelled.

As shown in FIG. 9B (a), the control unit 180 may output notification information for guiding the bending of the flexible display unit 151 on a locking screen 200 displayed in the locking state. The control unit 180 may determine whether or not the bending pattern of the flexible display pattern 151 corresponds to the pattern set through the setting screen of FIG. 9A.

For example, if the bending of the flexible display unit 151 is detected, based on the reference axis 'a' corresponding to a first bending pattern set in FIG. 9A, as shown in FIG. 9B (b), the control unit 180 counts a first setup time set corresponding to the first bending pattern. Here, the control unit 180 may output counting time information 311 on the locking screen so as to inform the user that the information on the first setup time and the bending of the flexible display unit 151 are detected.

Next, if the bending of the flexible display unit 151, corresponding to the first bending pattern, is maintained for the first setup time, the control unit 180 determines whether or not the bending of the flexible display unit 151 is detected, based on the reference axis 'b' corresponding to a second bending pattern, as shown in FIG. 9B (c). If the bending of the flexible display unit 151, corresponding to the second bending pattern, is maintained for a second setup time set corresponding to the second bending pattern, the control unit 180 converts the locking state into the cancellation state of the mobile terminal, as shown in FIG. 9B (d).

When the input of the first bending pattern is maintained for the first setup time as shown in FIGS. 9C (a) and (b), the control unit 180 may output notification information for receiving the second bending pattern. The control unit 180 may set a waiting time at which the next pattern can be received by the setting of the user or the control unit 180. When the next pattern is not input during the waiting time, the control unit 180 may convert, into an initialization state, the input process of a control command for converting the locking state into the cancellation state, as shown in FIG. 9C (c). When a pattern different from the predetermined bending pattern is input, the control unit 180 may provide information on the predetermined bending pattern by outputting notification information for informing the user that the predetermined pattern has not been input or by outputting a guide line corresponding to the predetermined bending pattern.

As described above, in the mobile terminal according to the embodiments, the locking state can be easily converted into the cancellation state using the bending characteristic of the flexible display unit.

Further, in the mobile terminal and the control method thereof according to the embodiments, the control signal for executing any one of a plurality of functions that can be performed in the mobile terminal can be generated using the bending of the flexible display unit and the time for which the bending is maintained. Thus, although a touch input is not applied on the flexible display unit so as to select any one of a plurality of functions, the user can easily perform the function that can be performed in the mobile terminal.

According to an embodiment of the present invention, the aforementioned methods may be implemented as codes readable by a processor in a medium in which a program is recorded. The medium readable by the processor may include, for example, a ROM, a RAM, a CD-ROM, a magnetic tape, a floppy disk, an optic data storage, etc. The medium may be implemented in the form of a carrier wave (e.g., transmission through the Internet).

The foregoing embodiments and advantages are merely examples and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
 a flexible display unit configured to be bent in response to an applied physical force;
 a detection unit configured to detect a bending of the flexible display unit; and
 a control unit configured to:
 count a time for which the bending is maintained if the bending is detected in response to the applied physical force, and
 execute at least one of a first function or a second function according to the time for which the bending is maintained,
 wherein the second function is executed when the bending of the flexible display unit is maintained for a reference time, the second function being executed after the first function is executed.

2. The mobile terminal of claim 1, wherein the first function or the second function are executed when the bending of the flexible display unit is released.

3. The mobile terminal of claim 1, wherein the first function and the second function are determined based on information displayed on the flexible display unit at a time point at which the bending is detected, a kind of activated application or which event occurs.

4. The mobile terminal of claim 1, wherein the reference time for which the bending is maintained is counted after the first function is executed.

5. The mobile terminal of claim 4, wherein the control unit is further configured to control the flexible display unit to display the counted time.

6. The mobile terminal of claim 1, wherein the control unit is further configured to sense an event has occurred on the mobile terminal while the flexible display is not being bent, and then to perform the first function or the second function.

7. The mobile terminal of claim 6, wherein when the event is an incoming call event indicating a call is incoming, the first and second functions include at least one of an accept incoming call function for accepting the incoming call, and a reject incoming call function for rejecting the incoming call.

8. The mobile terminal of claim 6, wherein when the event is an incoming message event indicating a message is incoming, the first and second functions include at least one of an accept indicating function for indicating an acceptance of the incoming message event, a message display contents function for displaying contents of the incoming message, a message execution function for displaying an input writing screen for responding to the incoming message, and an options menu option for displaying an options menu including a plurality of functions for responding to the incoming message.

9. The mobile terminal of claim 1, wherein the first function is a locking mode function for locking the mobile terminal, and the second function is a turn-off function for turning off the mobile terminal.

10. The mobile terminal of claim 1, wherein the controller is further configured to display different groups of information on the flexible display unit, and
wherein the first and second functions include at least one of selecting and highlight the different groups of information, magnifying content included in a selected group of information, reducing the content included in the selected group of information, and scrolling the different groups of information on the flexible display unit.

11. The mobile terminal of claim 1, wherein the flexible display unit is configured to be flexed along a longitudinal axis, along a horizontal axis and at edges of the mobile terminal.

12. A method of controlling a mobile terminal, the method comprising:
detecting a bending of the flexible display unit, wherein the flexible display unit is configured to be bent in response to an applied physical force;
counting a time for which the bending is maintained if the bending is detected in response to the applied physical force; and
executing at least one of a first function or a second function according to the time for which the bending is maintained,
wherein the second function is executed when the bending of the flexible display unit is maintained for a reference time, the second function being executed after the first function is executed.

13. The method of claim 12, wherein the first function or the second function are executed when the bending of the flexible display unit is released.

14. The method of claim 12, wherein the first function and the second function are determined based on information displayed on the flexible display unit at a time point at which the bending is detected, a kind of activated application or which event occurs.

15. The method of claim 12, wherein the reference time for which the bending is maintained is counted after the first function is executed.

16. The method of claim 15, further comprising controlling the flexible display unit to display the counted time.

17. The method of claim 12, wherein an event has occurred on the mobile terminal is sensed while the flexible display is not being bent, and then the first function or the second function are performed.

18. The method of claim 17, wherein when the event is an incoming call event indicating a call is incoming, the first and second functions include at least one of an accept incoming call function for accepting the incoming call, and a reject incoming call function for rejecting the incoming call.

19. The method of claim 17, wherein when the event is an incoming message event indicating a message is incoming, the first and second functions include at least one of an accept indicating function for indicating an acceptance of the incoming message event, a message display contents function for displaying contents of the incoming message, a message execution function for displaying an input writing screen for responding to the incoming message, and an options menu option for displaying an options menu including a plurality of functions for responding to the incoming message.

20. The method of claim 12, wherein the first function is a locking mode function for locking the mobile terminal, and the second function is a turn-off function for turning off the mobile terminal.

* * * * *